(12) United States Patent
In et al.

(10) Patent No.: US 11,738,647 B2
(45) Date of Patent: Aug. 29, 2023

(54) WIND TURBINE AND TRIBOELECTRIC SHEET BASED ENERGY HARVESTING SYSTEM FOR MOVING VEHICLE

(71) Applicants: Esther In, Germantown, MD (US); Sungyong In, Germantown, MD (US)

(72) Inventors: Esther In, Germantown, MD (US); Sungyong In, Germantown, MD (US)

( * ) Notice: Subject to any disclaimer, the term of this patent is extended or adjusted under 35 U.S.C. 154(b) by 0 days.

(21) Appl. No.: 18/059,968

(22) Filed: Nov. 29, 2022

(65) Prior Publication Data
US 2023/0101355 A1  Mar. 30, 2023

Related U.S. Application Data

(62) Division of application No. 16/614,368, filed as application No. PCT/US2018/055781 on Oct. 13, 2018, now abandoned.

(60) Provisional application No. 62/572,391, filed on Oct. 13, 2017.

(51) Int. Cl.
| | |
|---|---|
| *F03D 3/04* | (2006.01) |
| *F03D 1/04* | (2006.01) |
| *B60L 8/00* | (2006.01) |
| *F03D 9/32* | (2016.01) |
| *F03D 9/25* | (2016.01) |
| *F03D 5/06* | (2006.01) |

(52) U.S. Cl.
CPC ............... *B60L 8/006* (2013.01); *F03D 3/04* (2013.01); *F03D 9/32* (2016.05); *F03D 1/04* (2013.01); *F03D 5/06* (2013.01); *F03D 9/25* (2016.05); *F05B 2220/709* (2013.01); *F05B 2240/133* (2013.01); *F05B 2240/941* (2013.01); *Y02T 90/00* (2013.01)

(58) Field of Classification Search
CPC ..... F03D 3/04; F03D 9/32; F03D 1/04; F03D 5/06; F03D 9/25; B60L 8/006; F05B 2220/709; F05B 2240/133; F05B 2240/941; Y02T 90/00
See application file for complete search history.

(56) References Cited

U.S. PATENT DOCUMENTS

| | | | | |
|---|---|---|---|---|
| 3,621,930 A | * | 11/1971 | Dutchak | ........... B60L 8/006 180/2.2 |
| 5,287,004 A | * | 2/1994 | Finley | ........... F03D 9/25 180/2.2 |
| 5,680,032 A | * | 10/1997 | Pena | ........... F03D 9/12 290/55 |

(Continued)

*Primary Examiner* — Tulsidas C Patel
*Assistant Examiner* — S. Mikailoff
(74) *Attorney, Agent, or Firm* — Ichthus International Law PLLC

(57) ABSTRACT

A transportation vehicle may be equipped with electrical energy harvesting systems to harvest electrical energy for use. By way of example, in the transportation vehicle, a Venturi system may be used to receive an air flow and the speed of the air flow increase in a constricted area of the Venturi system, the air flow containing a large amount of kinetic energy. A plurality of electrical energy harvesting systems is disposed in the Venturi system and is configured to convert the kinetic energy contained in the accelerated air flow into electrical energy that can be used to power on-board electronics as well as one or more on-board batteries in the transportation vehicle, as the transportation vehicle is in motion.

3 Claims, 19 Drawing Sheets

(56) References Cited

U.S. PATENT DOCUMENTS

| | | | | |
|---|---|---|---|---|
| 6,882,059 | B1* | 4/2005 | DePaoli | B60L 8/006 |
| | | | | 290/55 |
| 9,057,357 | B2* | 6/2015 | Patel | F03D 9/007 |
| 10,181,771 | B2* | 1/2019 | Menaskanian | F03D 9/32 |
| 11,598,315 | B2* | 3/2023 | Peng | H02K 7/183 |
| 2002/0153178 | A1* | 10/2002 | Limonius | B60L 8/003 |
| | | | | 180/2.2 |
| 2013/0127393 | A1* | 5/2013 | Garcia | H02J 7/1415 |
| | | | | 290/55 |
| 2016/0218640 | A1* | 7/2016 | Wang | H02N 1/04 |
| 2018/0355840 | A1* | 12/2018 | Hsu | F03B 17/06 |
| 2019/0270386 | A1* | 9/2019 | Chang | F03D 9/32 |
| 2022/0052628 | A1* | 2/2022 | Dharmasena | H02N 1/04 |
| 2022/0205427 | A1* | 6/2022 | Peng | H02K 7/183 |

\* cited by examiner

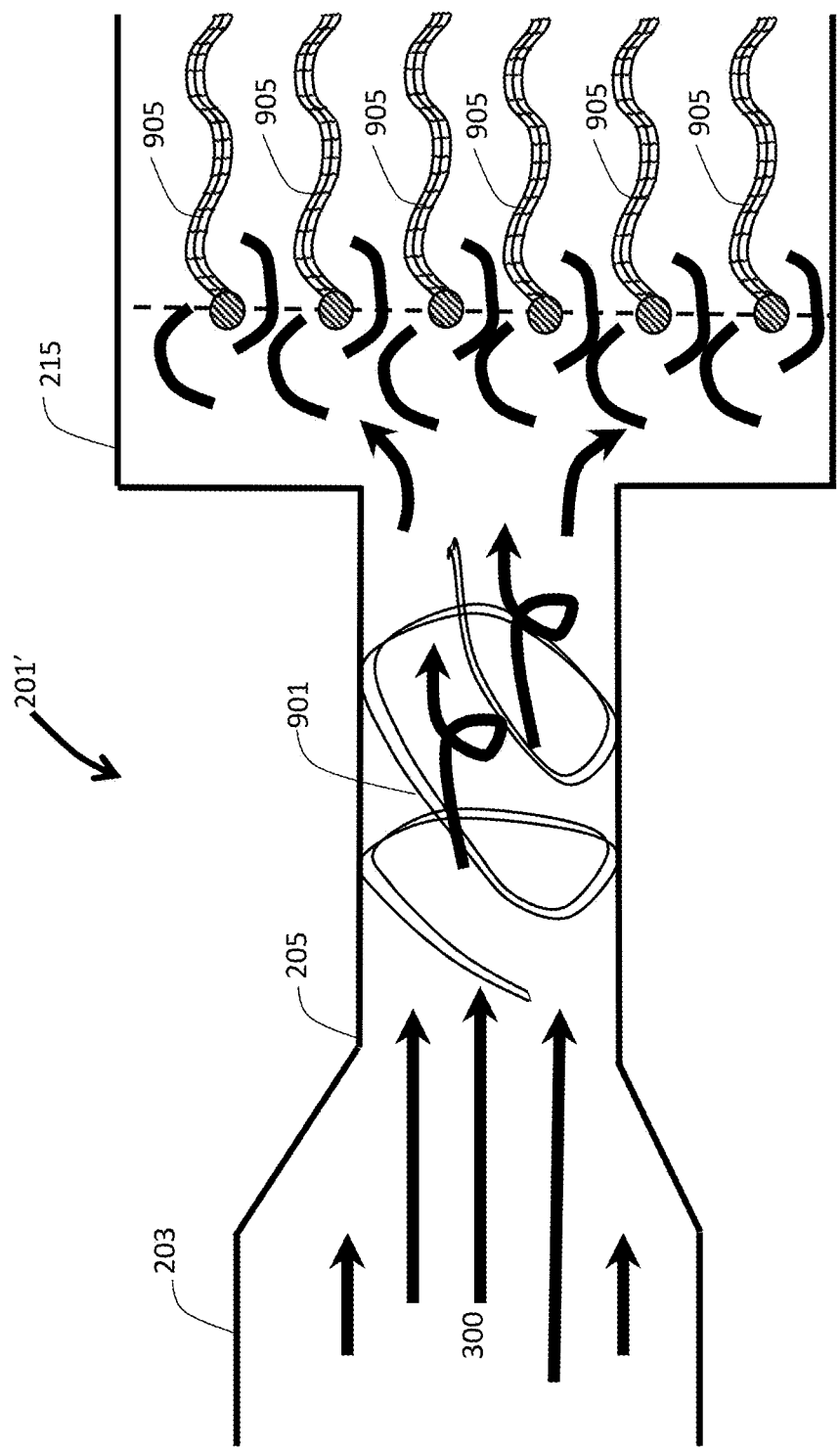

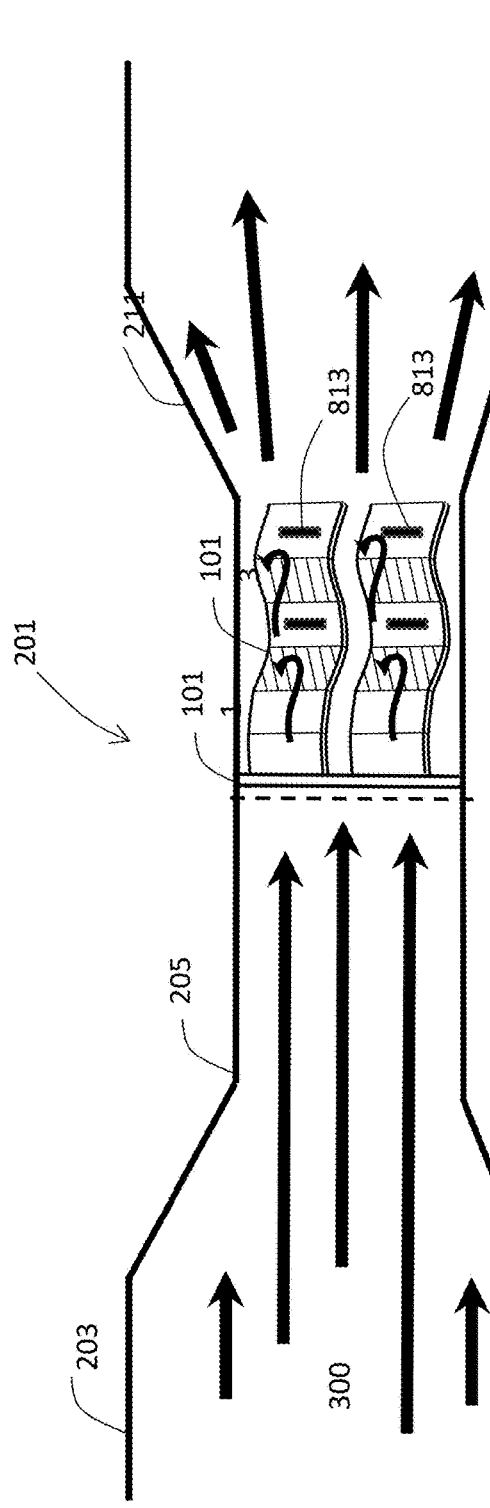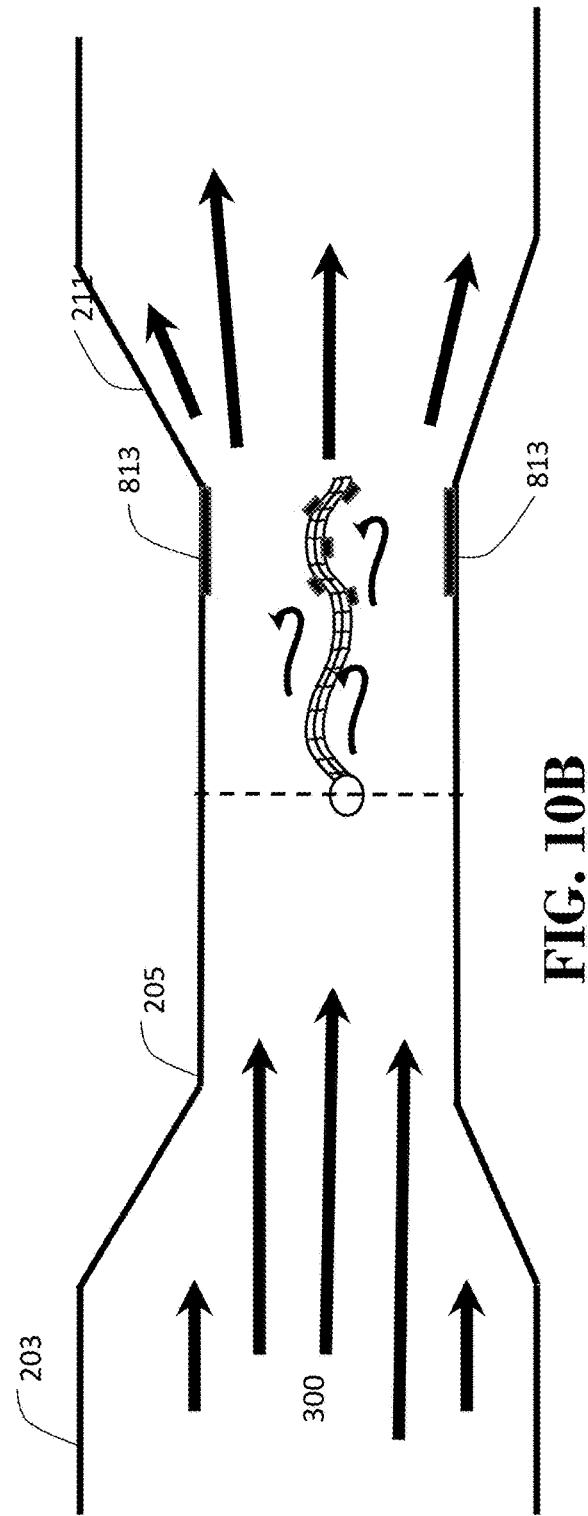

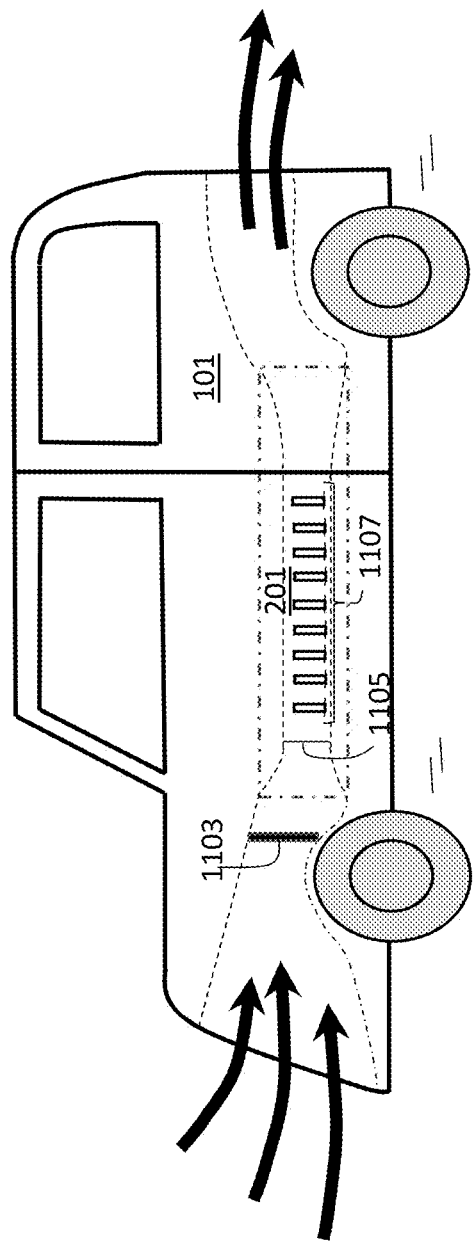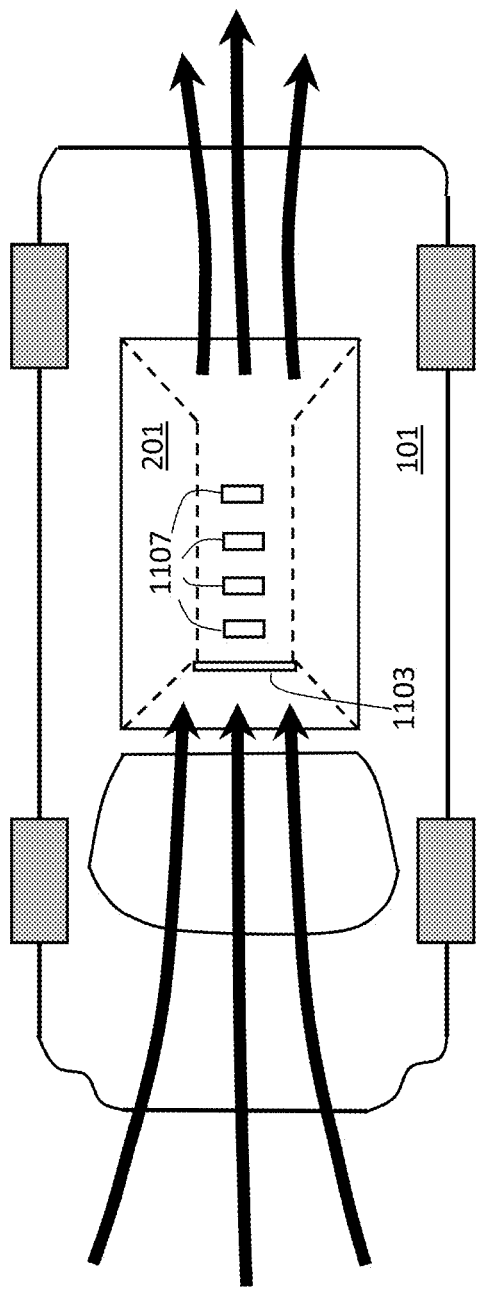
FIG. 11A
FIG. 11B

US 11,738,647 B2

WIND TURBINE AND TRIBOELECTRIC SHEET BASED ENERGY HARVESTING SYSTEM FOR MOVING VEHICLE

CROSS-REFERENCE TO RELATED APPLICATION(S)

This application is a division of U.S. patent app. Ser. No. 16/614,368, which is the national phase entry of the PCT application No. PCT/US18/55781, filed Oct. 13, 2018, which claims the benefit of U.S. Provisional Patent Application No. 62/572,391, filed Oct. 13, 2017, which is incorporated by reference herein in its entirety.

TECHNICAL FIELD

The present disclosure relates to method and apparatus for generating electricity and in particular, to methods and apparatus for generating electricity from a moving transportation system by converting kinetic energy and/or renewable source(s) into electrical energy based on increased air flow or wind based on Venturi effect in the moving transportation system

BACKGROUND

Technology for electric vehicles is advancing rapidly. Some electric vehicles are now reducing wasted energy and making electricity internally, using such as means as harvesting shock absorbers and active suspension, thermoelectric and photovoltaics. Harvesting electric energy will increase a driving range of the electric vehicle, because the harvested electrical energy may be used to power small sensors and actuators and other on-board electronics. However, recent energy harvesting techniques for electric vehicles focused on harvesting wasted energy such as regenerative braking.

There are numerous techniques for harvesting electrical energy from natural resources, such as solar, wind, waves, etc. Generating and using electricity based on solar energy is becoming more common and also, many wind farms are being used in various parts of the world to harvest energy in the natural resources. Many industries are embracing new technological advancements for efficiency. For example, in the automotive industry, electric vehicles replacing many conventional internal combustion engine-based vehicles. Solar based airplanes or drones are developed and marketed and coming into the marketplace. The costs of electric vehicles are coming down and more electric cars (either full electric or hybrid forms) are on the road. An entire transportation industry is seeing a fast-paced technology advancement and new transportation vehicles which are quickly replacing old fashioned vehicles.

But there is always a need for a more efficient technology for harvesting electrical energy systems to extend the travel range as well as to increase the efficiency of the transportation vehicle. As such, there still is a need for a better and enhanced method and apparatus for harvesting electric energy from a natural resource such as an air flow that is created by the transportation system in motion.

SUMMARY

The present technology described herein provides a system and method for increasing efficiency of the transportation system as well as generating electricity using natural resources. The present invention is a new, novel approach to harvesting electrical energy from wind or air flows from a moving system or a transportation system such as an electric vehicle.

A first embodiment of the present technology is a transportation vehicle with energy harvesting systems. The transportation vehicle includes a Venturi system configured to receive an air flow, and a plurality of electrical energy harvesting systems from the air flow. The Venturi system is disposed in or on the transportation vehicle. Also, each of the electrical energy harvesting systems is configured to generate electricity from the air flow in the Venturi system as the transportation vehicle moves forward in motion.

In an aspect of the present technology, each of the electrical energy harvesting systems in the transportation vehicle may include a pair of blades including a rotation axis with two ends, and a first alternator connected to one end of the pair of blades via a first shaft. The first alternator may include a magnet and coils and is configured to generate electricity based on rotary movement of the pair of blades by the air flow. The rotation axis of the pair of blades is perpendicular to a direction of the air flow in the Venturi system. Further, each of the electrical energy harvesting system may include a second alternator connected to the other end of the pair of blades via a second shaft, and the second alternator is configured to generate electricity based on the rotary movement of the pair of blades. As such, each of the electrical energy harvesting systems may have two electricity generating units coupled to two ends of the rotation axis of the pair of blades.

In an aspect of the present technology, the coils of the first alternator or the second alternator may be either carbon nanotubes (CNT) based wires or graphene based wires instead of copper wires. This reduces the weight of the alternators significantly as well as the efficiency of generating electricity because of superior conductivity of the CNT based wires or graphene based wires instead of copper wires, when used as the coils in the alternators.

In an aspect of the present technology, the transportation vehicle may include a different type of energy harvesting systems in the Venturi system disposed in the transportation vehicle. By way of example, in another aspect of the present disclosure, each of the electrical energy harvesting systems may include a pair of blades having a rotation axis with two ends, a triboelectric sheet including a plurality of triboelectric modules, and a displacer coupled to the pair of blades and the triboelectric sheet via a shaft. In this embodiment of the present technology, rotary movement of the pair of blades about the rotation axis due to an air flow in the Venturi system results in rotary movement of the displacer, thereby causing generation of electricity in the plurality of triboelectric modules.

Further, in another aspect of the present technology, each of the electrical energy harvesting systems further includes an alternator including a magnet and coils, and the alternator is connected to one end of the pair of blades. Also, as mentioned earlier, the coils of the alternator may be CNT based wires or graphene based wires instead of copper wires, which reduces the weight requirements of the alternator and increase the electricity generation efficiency of the alternator. Further, when a plurality of alternators is used as part of electrical energy harvesting systems, the alternators in an aspect of the present technology provides significant advantages over the conventional alternators that use copper wires as the coils for generating electricity.

In an aspect of the present technology, the displacer of the electrical energy harvesting system may include a rotatable body via the shaft, and a plurality of protrusions disposed on the rotatable body and is configured to face the triboelectric sheet. In this configuration, as the displacer rotates around the shaft, each of the plurality of triboelectric modules generates electricity.

In an aspect of the present technology, the transportation vehicle may include the electrical energy harvesting systems, each of which includes a plurality of generator rods disposed in a constriction area of the Venturi system. Each generator rod in the form of a cylinder is configured to generate electricity based on transverse movements of the generator rod due to vortex induced vibrations. Further, the plurality of generator rods may be disposed in a predetermined arrangement such that a total amount of electrical energy harvested in the Venturi system is maximized.

In another aspect of the present technology, the transportation vehicle may include the electrical energy harvesting systems, each of which includes a support rod disposed in the Venturi system, and a piezoelectric sheet including a plurality of piezoelectric modules in the form of a flag design. In this embodiment, when the air flow passes the support rod and the piezoelectric sheet, electricity is generated due to stress imposed on the piezoelectric sheet as part of vortex induced vibration phenomenon.

In an aspect of the present technology, the support rod of the electrical energy harvesting system may be in the form of a cylindrical rod, a T-shaped rod, or the like.

In another aspect of the present technology, the piezoelectric sheet of the electrical energy harvesting system may further include a plurality of magnetic strips to prevent contact with adjacent piezoelectric sheets or an inner wall of the Venturi system.

In another aspect of the present technology, the Venturi system may include a turbulence region where turbulence is created by a certain design or an object to increase the intensity of the air flow, and thus the stress or force on the piezoelectric modules. In an aspect of the present technology, a turbulence creation object may be placed in a constriction area of the Venturi system. For example, the turbulence creation object may be in the form of a helix shaped object placed in the constriction area of the Venturi system. Alternatively, the greater turbulence may be created by having no diffuser region in the Venturi system.

BRIEF DESCRIPTION OF THE DRAWINGS

A more detailed understanding may be obtained from the following description in conjunction with the following accompanying drawings.

FIG. 9 is a diagram conceptually illustrating an example embodiment of the present technology in accordance with an aspect of the present disclosure;

FIGS. 10A and 10B are diagrams conceptually illustrating example embodiments of the present technology in accordance with an aspect of the present disclosure;

FIGS. 11A and 11B are diagrams conceptually illustrating example embodiments of the present technology in accordance with an aspect of the present disclosure;

DETAILED DESCRIPTION

Figure 1:
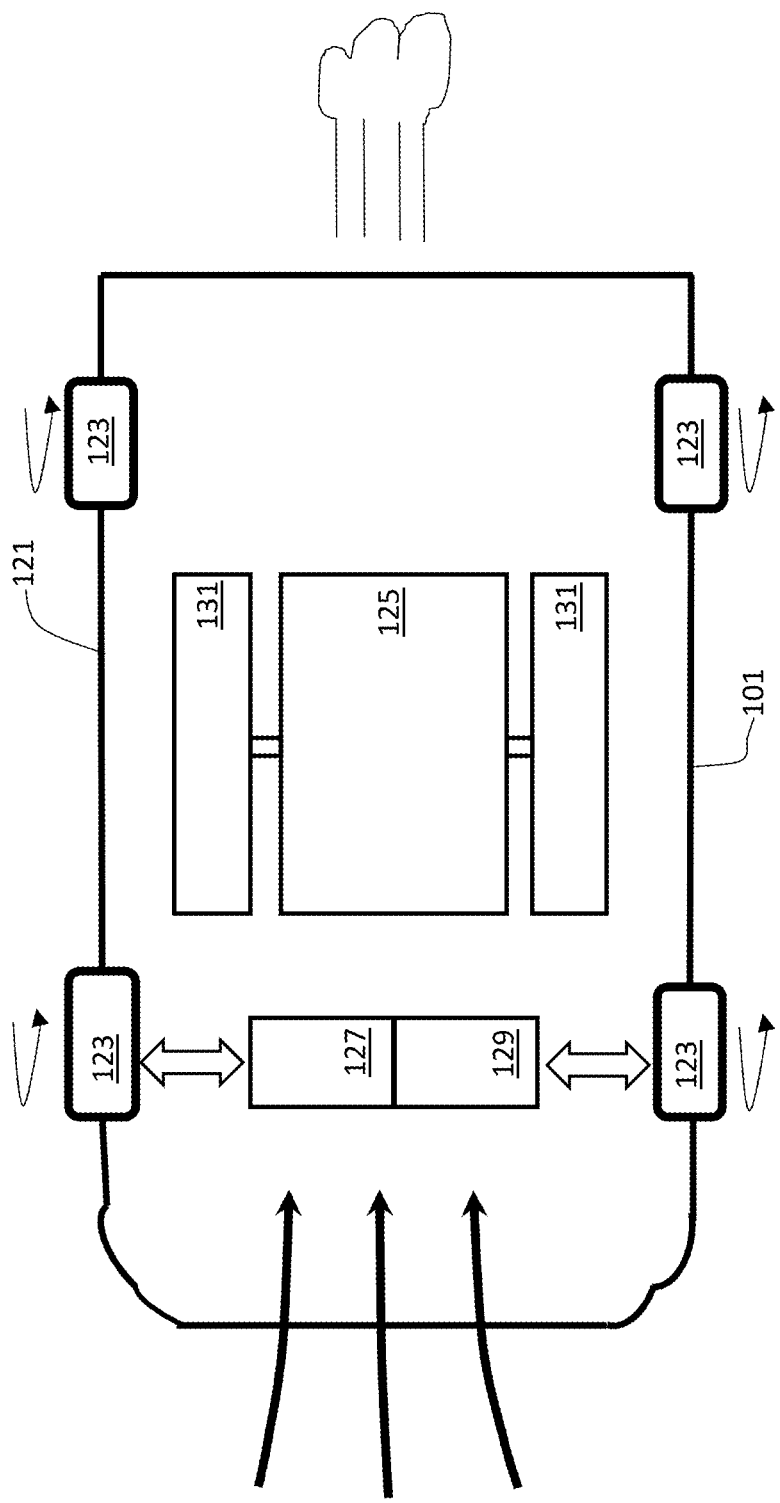
FIG. 1 illustrates an example embodiment of the present technology in accordance with an aspect of the present disclosure.

The detailed description of illustrative examples will now be set forth below in connection with the various drawings. The description below is intended to be exemplary and in no way limit the scope of the claimed invention. It provides detailed examples of possible implementation(s), and as such they are not intended to represent the only configuration(s) in which the concepts described herein may be practiced. The detailed description includes specific details for the purpose of providing a thorough understanding of various concepts, and it is noted that these concepts may be practiced without these specific details. In some instances, well known structures and components are shown in block diagram form in order to avoid obscuring such concepts and like reference numerals are used in the drawings to denote like elements and features.

It is also noted that in some instances while the methodologies are described herein as a series of steps or acts, for the purpose of simplicity it is to be understood that the claimed subject matter is not limited by the order of these steps or acts, as some steps or acts may occur in different orders and/or concurrently with other acts from that shown and described herein. Further, not all illustrated steps or acts may be required to implement various methodologies according to the present technology disclosed herein. Also, it should be appreciated that the apparatus and methods described herein may be utilized separately or in combination with other aspects of the present disclosure, or in combination with conventional technology, without departing from the teachings of the present disclosure.

There are three main components of an electric vehicle in general: an electric motor, a controller and a battery. When one turns on the car, the circuit is closed and current is passed from the battery. The controller takes the power from the battery and passes it onto the electric motor which rotates the wheels to move the vehicle. In other words, the electric motor converts electrical energy to mechanical energy in order to move the electric vehicle. Most electric vehicles have a range of about 80 to 100 miles on a full battery while a few electric vehicles have ranges up to 350 miles. When the battery is depleted, it can take anywhere from 30 minutes with fast charging, up to a full day to recharge the battery. As a result, it is a significant interest to many others to extend the travel distance of the electric vehicle with the charged battery.

Wind energy is one of the nature's main sources for generating electrical energy. Wind turbines in the outdoors at large scale can generate up to 100 kW electrical energy with a wind speed of about 30-35 mph. A scientific model for the wind energy provides that the power that can be extracted from the wind increases as velocity is cubed. That is, power per unit area is equal to $k*V^3$, where k is a fixed constant representing the combined fixed rotor blade area, air mass and efficiency of turbine, and V is wind velocity. Then the power per unit area becomes roughly equal to 0.0006 times wind velocity cubed. Thus, by way of example, one theoretical model shows that energy stored in 20 mph wind is equal to about 600 Watts per square meter, for the outdoor wind turbines. Thus, the wind turbines at large scale can generate a great amount of electrical energy at a high wind speed.

As such, transportation vehicles often travel a very high speed of more than 60 mph. That means that the air flow created by the motion of the transportation vehicle is about 60 mph. Furthermore, the Venturi effect may be utilized to further increase the speed of the air flow or the wind created by the motion of the transportation vehicle for the purpose of generating and harvesting electrical energy from the energy stored in the high-speed air flow or wind.

Thus, by employing one or more aspects of the present technology disclosed herein, the electrical energy can be generated and harvested on electric vehicles in motion and thus be used to extend the travel distance of the electric vehicles while the electric vehicles are driven.

FIG. 1 is a conceptual block diagram for a transportation vehicle, e.g., an electric vehicle, including an example embodiment of the present technology. By way of example, in an aspect of the present disclosure, an electric vehicle 101 includes a body frame 121, a set of tires 123, a battery 125, a motor 127, an inverter 129, and electrical energy harvesting systems 131. The motor 127 draws necessary power from the battery 125 and turns the tires 123. Also, the inverter 129 is used for regenerative braking and storing electrical energy harvested from regenerative braking to the battery 125. Further, the electric vehicle 101 includes one or more electrical energy harvesting systems 131 to harvest electrical energy from an air flow, e.g., wind, captured when the electrical vehicle 101 is moving in a direction, in an aspect of the present disclosure. The harvested electrical energy by the electrical energy harvesting systems 131 may be used to operate various sensors or electronic equipment on board the electric vehicle 101 or recharge the battery 125, thereby extending the distance the electric vehicle 101 travels with the battery 125.

Figure 2:
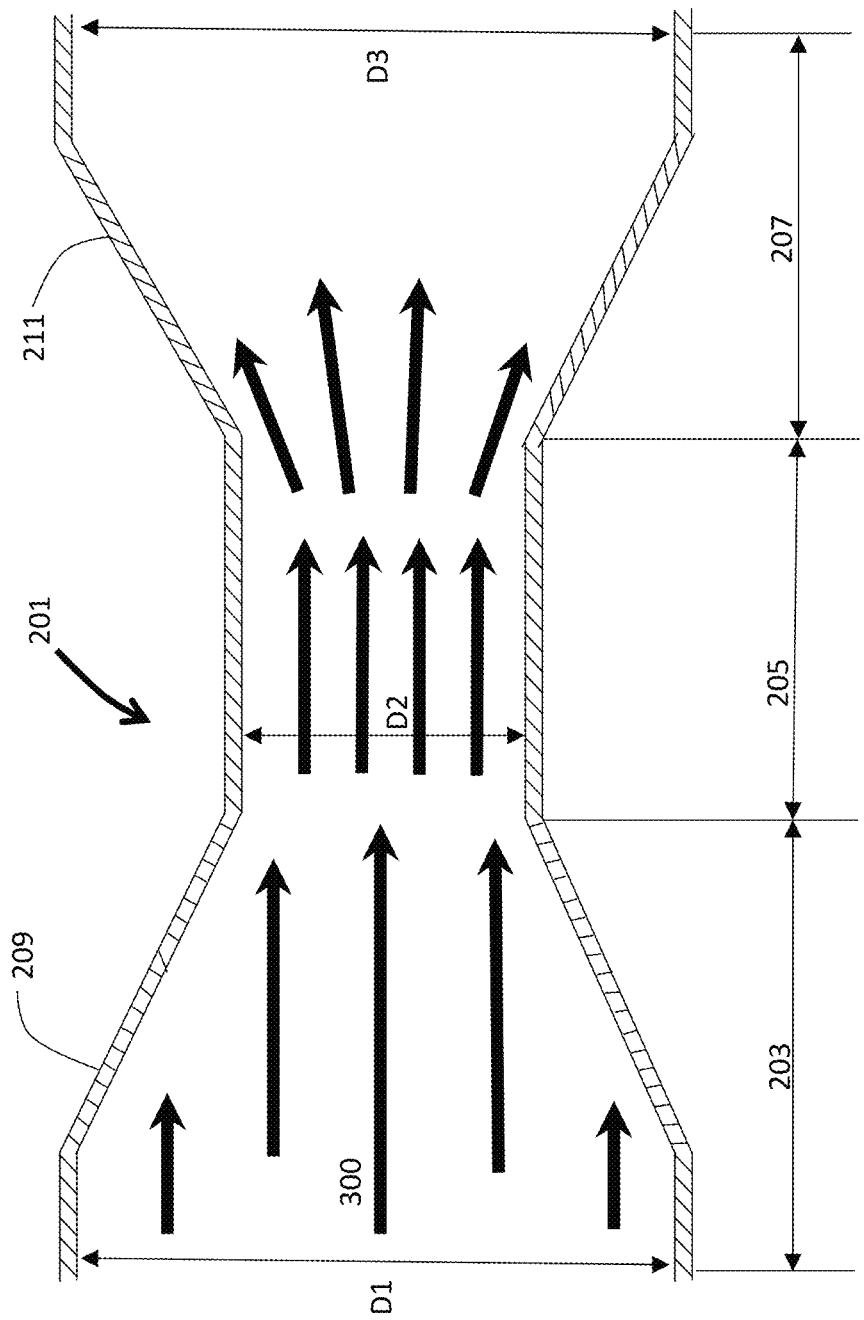
FIG. 2 is a diagram conceptually illustrating a Venturi principle in accordance with an aspect of the present disclosure.

FIG. 2 provides a conceptual illustration of one of the principles (the Venturi principle) used in the embodiment of the present disclosure. That is, to maximize the extent of electrical energy harvesting from the wind created or air flow the electric vehicle 101 encounters when in motion with a speed, a Venturi effect is adopted in constructing an example embodiment of the present technology. By way of example, the present technology includes a Venturi system in or on the electric vehicle 101 for harvesting electrical energy from the air flow created in the Venturi system in the electrical vehicle, e.g., the transportation vehicle. Here, the phrase "transportation vehicle" is used herein in the present disclosure to mean any electric vehicle or a hybrid vehicle or any moving system with a speed for various transportation purposes.

By way of example, in accordance with an aspect of the present disclosure, a Venturi system 201 may include an inlet 203, a constricted area 205, and an outlet 207. For the illustration purposes, let's assume that the Venturi system 201 is constricted using cylindrical pipes. The inlet 203 may include a tapered region 209 in such a way that a diameter D2 of the constricted area 205 is smaller than a diameter D1 of the inlet 203. The tapered region 209 connects the wider inlet 203 to the narrower constricted area 205. According to the Venturi principle, when a fluid including air, water, liquid, gas, or any other type flows through the inlet 203 and pass through the constricted area 205, a speed of the fluid becomes very high in the constricted region 205 and pressure inside the constricted region 205 gets smaller than that of the pressure in the inlet 203. In the example, the outlet 207 includes a tapered region 211 that is configured to act as a diffuser, and the speed of the fluid gets lower as the fluid exit the constricted area 205. The tapered region 211 is constructed with a wide slope so that an amount of turbulence in the fluid is reduced as the fluid exits the constricted area 205.

Using the Venturi principle, in an aspect of the present disclosure, an air flow striking a transportation vehicle in motion, such as the electric vehicle 101, may be allowed to pass through a Venturi system that is in or on the electric vehicle 101 as part of an electrical energy harvesting system in such a way that the speed of the air flow can be accelerated through the Venturi system. This accelerated air flow has a higher amount of energy stored than the air flow striking a transpiration vehicle in motion. Thus, the greater amount of energy stored in the accelerated air flow in the Venturi system can be harvested or converted into electricity for use.

Figure 3A:
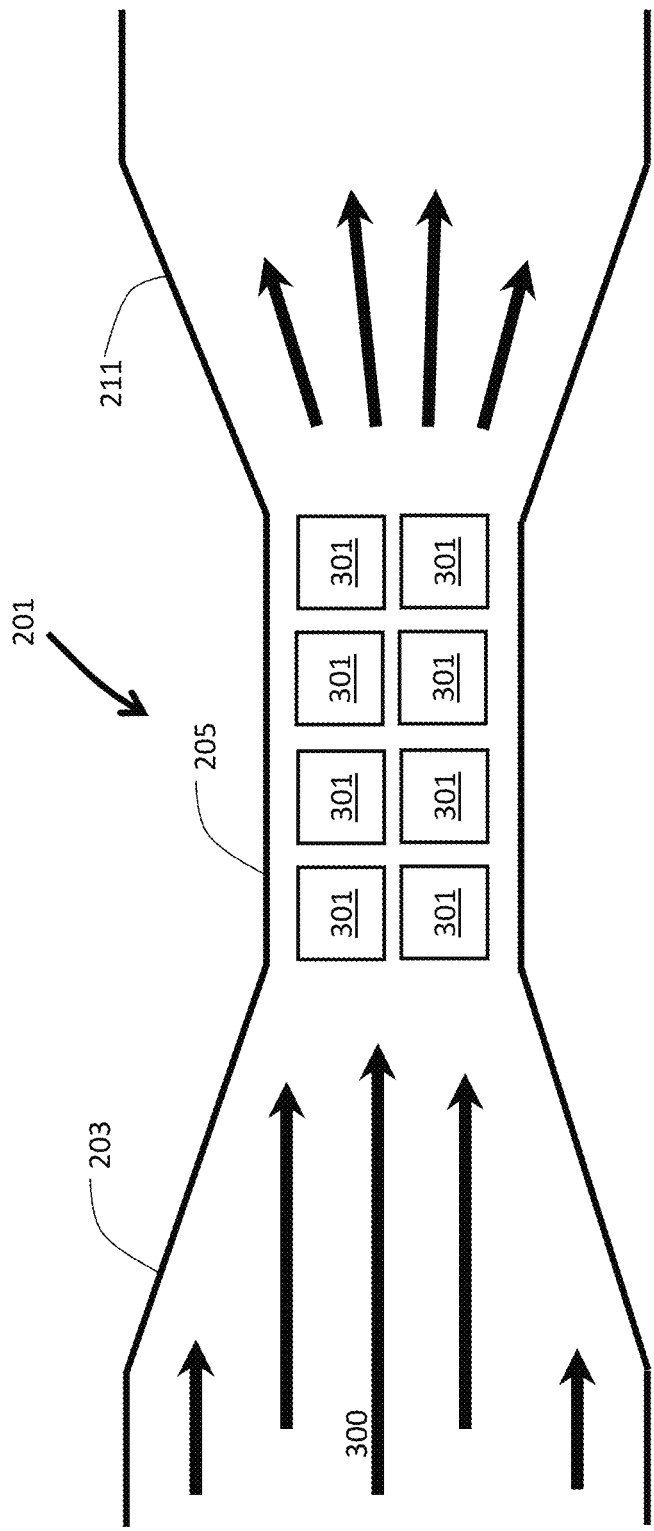
FIGS. 3A and 3B illustrate example embodiments of the present technology in accordance with an aspect of the present disclosure.
Figure 3B:
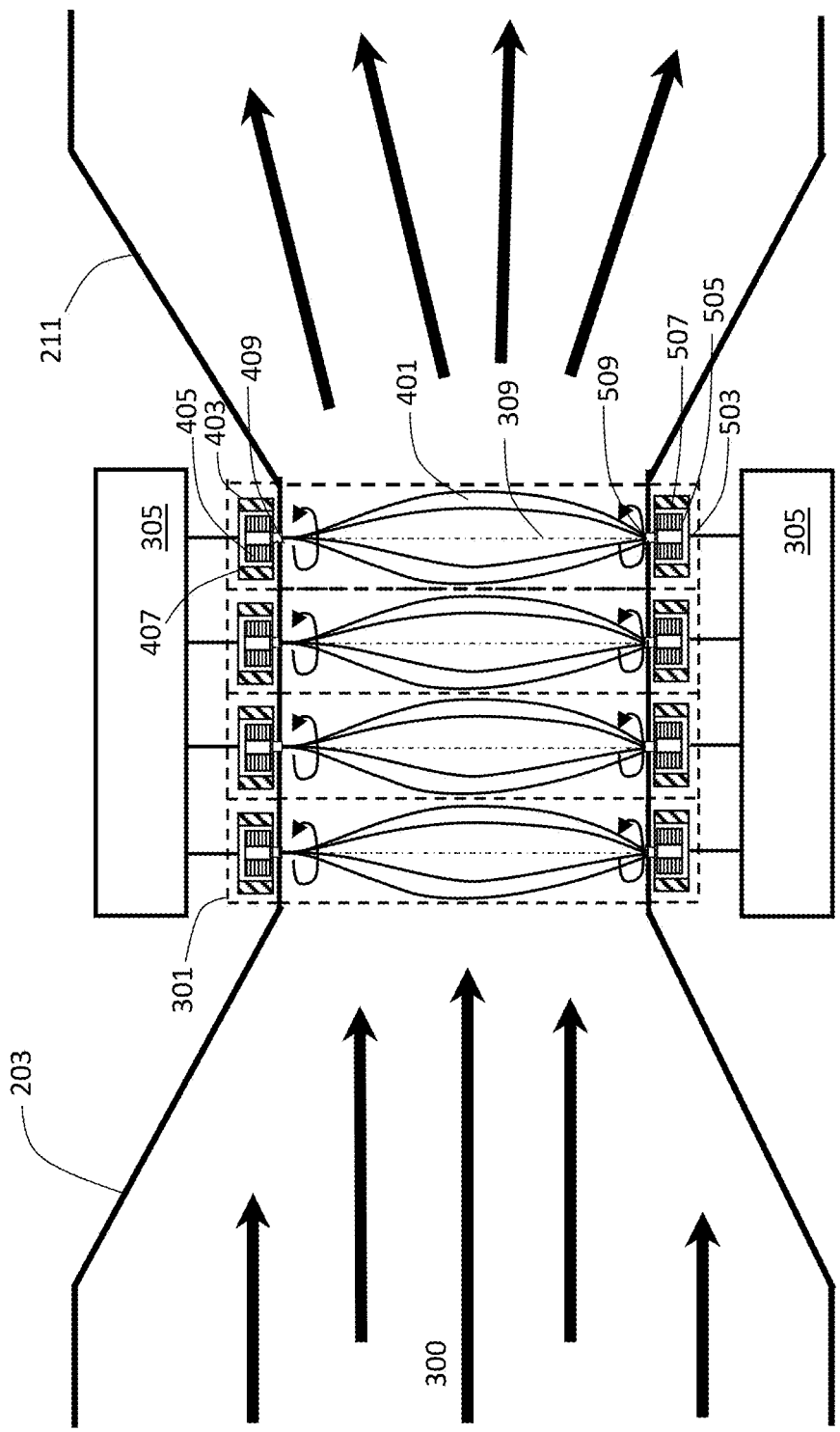

By way of example, FIGS. 3A and 3B illustrate one embodiment of the electrical energy harvesting systems in or on the transportation vehicle, in accordance with an aspect of the present disclosure. FIG. 3A is a block diagram (a top view) conceptually illustrating a plurality of electrical energy harvesting systems 301 disposed in a Venturi system 201 according to the present technology in a transportation vehicle. FIG. 3B is a block diagram (a side view) conceptually illustrating the plurality of electrical energy harvesting systems 301 disposed in the constricted area of the Venturi system 201. As the incoming air flow 300 enters the constricted area 205 of the Venturi system 201, the speed of the air flow 300 increases greatly because of the constriction area and travels with a very high speed through the constricted area 205. A plurality of electrical energy harvesting systems 301 are configured to leverage the high-speed of the air flow in the constricted area 205 and generate and harvest electrical energy from the energy stored in the high-speed air flow.

In an aspect of the present disclosure, in FIG. 3B, each of the plurality of electrical energy harvesting systems 301 may include a pair of blades 401 including a rotation axis 309 with two ends, a first alternator 403 including a rotor (e.g., a magnet 405) and a stator (e.g., coils 407), and a first shaft 409 coupled to the pair of blades 401 and the first alternator 405. Further, each of the plurality of electrical energy harvesting systems 301 may include a second shaft 509, and optionally a second alternator 503 including a rotor (e.g., a magnet 505) and a stator (e.g., coils 507). The second shaft 509 is coupled to the second alternator 503. In the first alternator and the second alternator, a typical construction of an alternator consists of a rotor and a stator winding. The rotor may be either an electromagnet or a permanent magnet. In the example, the rotor is a permanent magnet such as the magnet 505, and the stator winding is the coils 507. Thus, as the rotor revolves inside the coils, it generates an alternating current (AC) in the coils, and the AC current may also be rectified into direct current (DC) via a set of diodes. Further, each of the alternators may include a regulator and is electrically isolated from the others.

In the example, the rotation axis 309 is perpendicular to a direction of the high-speed air flow that is sped up in the constriction area 205 of the Venturi system 201. Thus, for harvesting the electrical energy from the energy contained the high-speed air flow in the constriction area 205 of the Venturi system 201, as the pair of blades 401 turns it rotates the shafts 409 and 509, which in turn rotates the magnets 405 and 505 in the respective alternators, thereby generating electricity via the coils 407 and 507. So, the first alternator 403 and the second alternator 503 generate electricity based on the rotary movement of the pair of blades by the high-speed air flow in the constriction area 205.

Further, in the example, the pair of blades are vertical axis turbine blades (e.g., Darrieus type turbines) that convert kinetic energy in the air flow into mechanical energy, which is to be then converted into electricity. However, other types of vertical axis turbines blades may be used such as variants of Darrieus turbines, Savonius turbines or the like. The example blades are C-shaped rotor blades that are eggbeater-like in appearance and may be built with two or three blades. The Darrieus blades use a specific airfoil design to turn its blades along its vertical rotation axis, and in one implementation, the blades may have a helical shape to smooth out the air flow and decrease vibration for increased efficiency. Further, in another aspect of the present disclosure, the pair of blades may be coupled to a gear box which is coupled to an electrical generator with a large stator and rotor.

Referring to FIG. 3B, in the example, each of the electrical energy harvesting systems 301 is coupled to a controller 305 for control and management of the generated electricity. By way of example, the controller 305 may include one or more inverters to convert the alternating current generated by the alternators into direct current for storage purposes or combining them for increasing the voltage requirement for use and/or storage of the generated electrical energy. Further, two or more alternators may be connected in series in order to increase the voltage of the current generated. Alternatively, the alternators may be connected in parallel connection so that if one of them fails then the remaining alternators continue to operate for the purpose of harvesting the electrical energy while the transportation vehicle is in motion.

In another aspect of the present technology, the alternator 407 or 507 may include coils made of either carbon nanotube (CNT)-based wires or graphene-based wires.

Conventional alternators include coils made of copper wires which may increase weight requirements on an electric vehicle. Compared to conventional copper wires, CNT-based wires or graphene-based wires have superior characteristics. By way of example, the CNT-based wires (or CNT wires) can be spurn into yarns and may have one-tenth the weight of copper wires, but are much more flexible and are stronger. Also, the CNT wires are corrosion resistant and can carry a higher current (e.g., 100,000 amps of current per square centimeters) than copper wires. Further, graphene-based wires (or graphene wires) are another alternative to copper wires. Graphene ribbons may be spurn into yarns to make graphene wires, which also provide similar benefits of the CNT wires over copper wires. Also, graphene wires can be made with a much smaller diameter and still carry an equivalent amount of current compared to copper wires, providing weight savings.

By way of example, it is known that replacing copper wires with graphene wires may save up to 70% in the cable weight. This is a significant aspect in designing an alternator for reduced weight requirements for electric vehicles. In an design of a conventional alternator, the length and gauge of the copper wire used in the coil will result in the generation of an electricity output. In the conventional alternator, the number of turns in the coil will increase an amount of magnetic flux cut by the coil made of copper wires which will increase the electrical output. As such, in the conventional alternator, the thicker the wire the more amps the wire will produce. However, in an aspect of the present disclosure, the alternators including CNT wires or graphene wires of the coil inside will produce a higher electric output from the rotatory movements of the pair of blades with much less weight requirements when a plurality of electrical energy harvesting systems are used in the electric vehicle, thereby increasing the efficiency of the electric vehicle. Further, in another aspect of the present disclosure, to increase the electric output from the alternator, e.g., to increase the flux that flows through the coil, soft iron may be laminated on a surface of the magnet in the alternator.

In an aspect of the present technology, a triboelectric effect may be used in the electrical energy harvesting systems. The triboelectric effect is used for generating electricity in which certain materials become electrically charged after they come in contact with a different material. That is, a charge separation occurs because of the physical contact and removal of contact of different materials. When two sheets of dissimilar materials (e.g., polymer and polydimethylsiloxane sheets) are in contact, electrons flow from one material to the other, and when the sheets are separated, one sheet holds an electrical charge isolated by a gap between them. As such, when an electrical load is connected to two electrodes placed at the outer edge of the two surfaces, a small current will flow to equalize the charges. When this process is repeated, an alternating current is produced. This alternating current can thereafter be harvested as electricity.

Figure 4A:
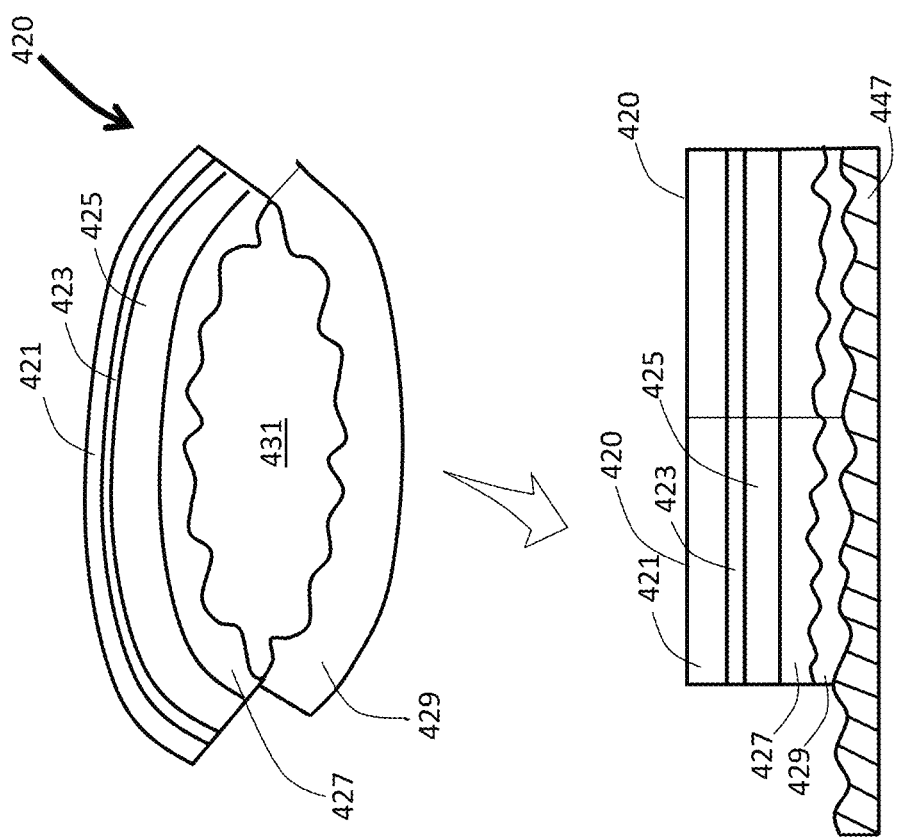
FIG. 4A is a diagram conceptually illustrating a triboelectric effect of a triboelectric module in accordance with an aspect of the present disclosure.

By way of example, as described in U.S. Pub. Nos. 2014/0084748 and 2018/0091064, which are incorporated herein in their entirety, triboelectric sheets similar to those described therein may be constructed. As an example, a triboelectric module may be constructed, as shown in FIG. 4A, which may include a top electrode 421, a first substrate material layer 423, a second substrate material layer 425, a first contact layer 427, a second contact layer 429, and a gap 431 between the first contact layer 427 and the second contact layer 429. The first substrate material layer 423 may include poly (4,4'-oxydiphenylene-contact pyromellitimide). The second substrate material layer 425 may include a $SiO_2$ material. The first layer 427 may include a polymer sheet, PDMS, PTFE, FEP, PVC, a Polumide, or the like having a first thermal expansion coefficient. The second substrate material layer 425 may include a ceramic film having a second thermal expansion coefficient that is less than the first thermal expansion coefficient. The second contact layer 429 may include electrically conductive metal layer defining a concave shape. When the compression force is applied to the triboelectric module 420, the triboelectric module 420 gets flattened and the first contact layer 427 and the second contact layer 429 make a close contact with each other. Once released, the two will separate and revert back to their original shape due to resilience. This cycle of contact and a gap 431 will generate electricity in the triboelectric module 420. Further, the triboelectric modules 420 may not be limited to the example construction of FIG. 4A, but other types of constructions may be used.

Figure 4B:
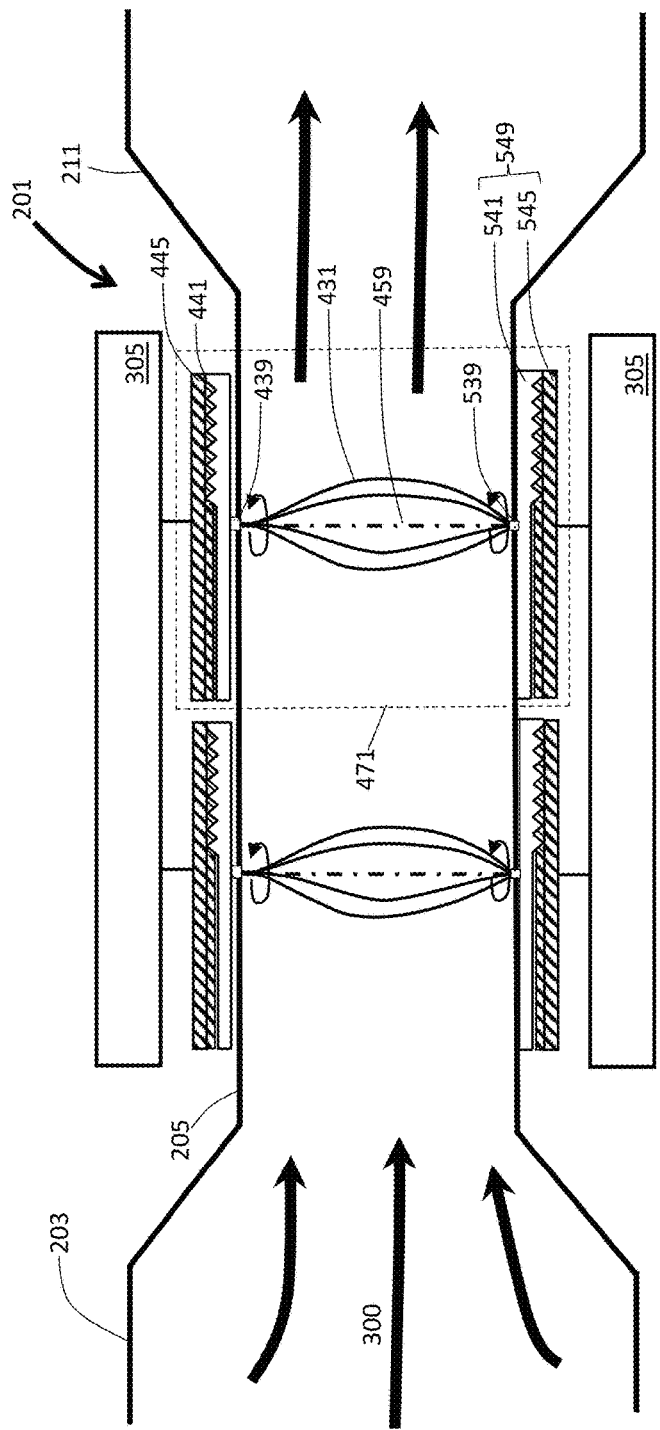
FIGS. 4B-4D are diagrams conceptually illustrating example embodiments of the present technology in accordance with an aspect of the present disclosure.

FIG. 4B illustrates an example embodiment in accordance with an aspect of the present disclosure. The example embodiment of the present technology includes a plurality of electrical energy harvesting systems 471 in the constriction area 205 of the Venturi system 201 of the transportation vehicle 101. Each of the electrical energy harvesting systems 471 is configured to include a pair of blades 431 having a rotation axis 459 with two ends, a triboelectric sheet 445 and a displacer 441 coupled to the pair of blades and the triboelectric sheet 445 via a shaft 439. The triboelectric sheet 445 includes a plurality of triboelectric modules 429. Each of the electrical energy harvesting systems 471 generates electricity in the plurality of triboelectric modules 429 as the resulting rotary movement of the displacer 441 is caused by the rotary movement of the pair of blades about the rotation axis 459 because of the incoming air flow 300 in the constricted area 205 in the Venturi system 201 in or on the transportation vehicle in motion.

Figure 4D:
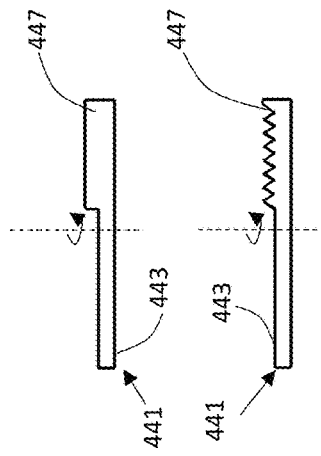
Figure 4C:
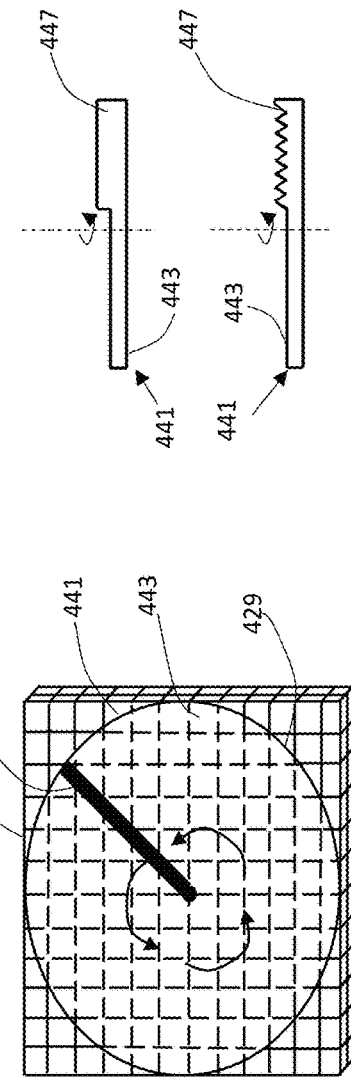

Further, in an aspect of the present disclosure, as shown in FIGS. 4C and 4D, the displacer 441 includes a rotatable body 443 via the shaft 439, and a protrusion 447 disposed on the rotatable body 443. FIG. 4D is cross-sectional views of the displacer 441 showing two possible embodiments of the protrusion 447. Thus, as the rotatable body 443 of the displacer 441 rotates around the shaft 439, the protrusion 447 causes contact and removal of contact between two different materials of the triboelectric modules 429, thereby generating electricity from the triboelectric effect of the triboelectric module 429. Each triboelectric module 429 is configured to include a separation between the two different materials as in FIG. 4A and also as described in U.S. Pub. No. 2018/0091064 for a maximum amount of electricity generation from the triboelectric module 429. Further, in an aspect of the present disclosure, the protrusion 447 may include a predetermined shape in such a way that the plurality of triboelectric modules 429 of the triboelectric sheet 445 is effectively affected, e.g., a gap or separation between two materials of the triboelectric modules is closed as the protrusion 447 is swept over and pressure is applied over the triboelectric modules 429.

In another aspect of the present disclosure, the electrical energy harvesting system 471 may further be configured to include a triboelectric sheet 545 and a displacer 541 coupled to the pair of blades 431 and the triboelectric sheet 545 via a shaft 539. As mentioned above, as the pair of blades 431 turns about the rotation axis 429 because of the air flow 300 in the constriction area 205 of the Venturi system 201, the triboelectric sheet 545 generates electricity via the displacer 541 and a plurality of triboelectric modules of the triboelectric sheet 545. The triboelectric sheet 545 and the displacer 541 (or the triboelectric sheet 445 and the displacer 441) may form a triboelectric generator 549. Further, the electricity generated by the electrical energy harvesting systems 471 may be supplied to the controller 305 for control and management of the generated electricity. The generated electricity may be rectified and supplied to various on-board electronics in the transportation vehicle or stored for later use in one or more storage devices (not shown) or a main battery such as the battery 125 as shown in FIG. 1.

Figure 5:
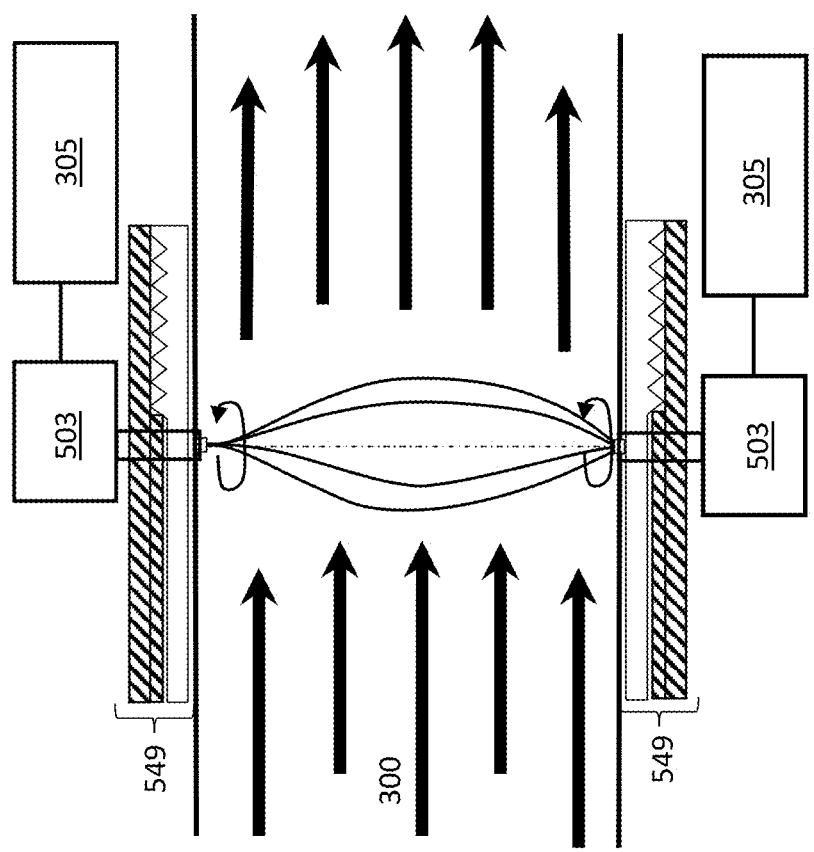
FIG. 5 illustrates an example embodiment of the present technology in accordance with an aspect of the present disclosure.

In another aspect of the present disclosure, as shown in FIG. 5, each of the electrical energy harvesting systems 471 as shown in FIG. 4B may further include alternators 503 coupled to the triboelectricity generators 549 for additional electrical energy harvesting to increase the electricity output.

The controller 305 may further include various functions, in addition to the control and management functions, including functions to control various systems for generating and/or charging the one or more auxiliary electrical energy storage units (not shown). Further, the controller 305 may be configured to monitor various health statuses of the electrical energy harvesting systems 301, 471 and generate one or more alert messages to an internal or external system or an operator of the transportation vehicle 101, if one or more fault conditions are detected during a health check. By way of example, when one or more of the electrical energy harvesting systems 301, 471 fail to properly operate, the controller 305 may send one or more alert messages to a main processor or other devices in the transportation vehicle 101, or alternatively wirelessly to the operator of the transportation vehicle 101.

Figure 6:
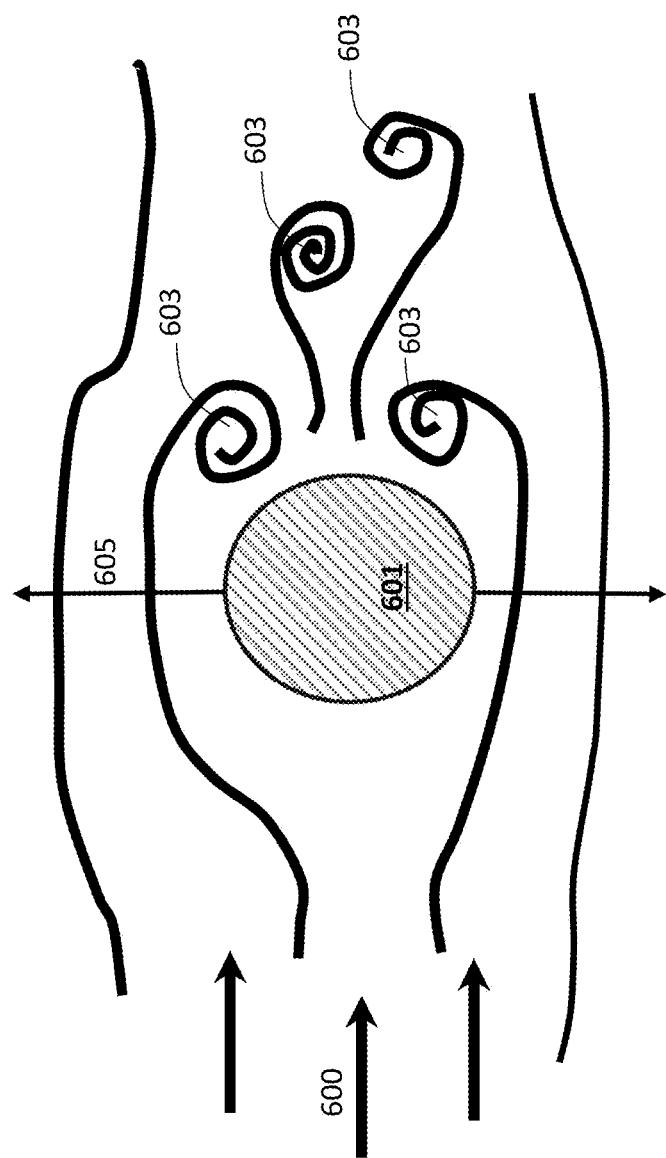
FIG. 6 is a diagram conceptually illustrating a vortex induced vibration in a fluid flow in accordance with an aspect of the present disclosure.

In another embodiment of the present technology, a "vortex induced vibrations" phenomenon over an object in a fluid flow may also be utilized to harvest electrical energy from energy stored in the fluid flow, e.g., energy stored in the wind created in a Venturi system of the electric vehicle 101 or transpiration vehicle in motion. It is known that the vortex induced vibration or vortex shedding occurs because of viscosity of the fluid passing over a bluff body. To put into simple terms, when a stationary object such as a cylindrical rod is placed in the path of a flowing fluid, vortices may be induced. At low speed, the flow past the object remains a steady flow and no rotational flow is produced. At higher speed some rotational flow patterns are developed on the wake, and at highest speed, in addition to rotational flow, some turbulence flow behavior such as one creating vortices develop, resulting in a "vortex shedding" phenomenon. That is, as shown in FIG. 6, when a fluid flow 600 over an object, e.g., a cylindrical body 601 continues at a certain speed, turbulence will cause vortices 603 to be "shed" from the trailing edge of the object 601 in an alternating manner on the top and bottom of the object, and as a result the object 601 makes transversal movements (or vibrations) 605 normal to the direction of the fluid flow 600. Further, when the object 601 vibrates normal to the fluid flow 600 at the vortex shedding frequency and the vortex shedding frequency approaches a natural frequency, it synchronizes with the object's natural frequency, thereby causing the object to make large vibrations or transversal movements normal to the direction of the fluid flow. The shape of the object typically determines the efficiency of the object for forming vortices. The object may have different cross-sections such as circular, triangular, rectangular, T-shaped, etc.

Using the vortex induced vibration of an object in a fluid flow, electrical energy can be additionally harvested for use. FIGS. 7-10 shows various embodiments of the present technology in accordance with an aspect of the present disclosure.

Figure 7A:
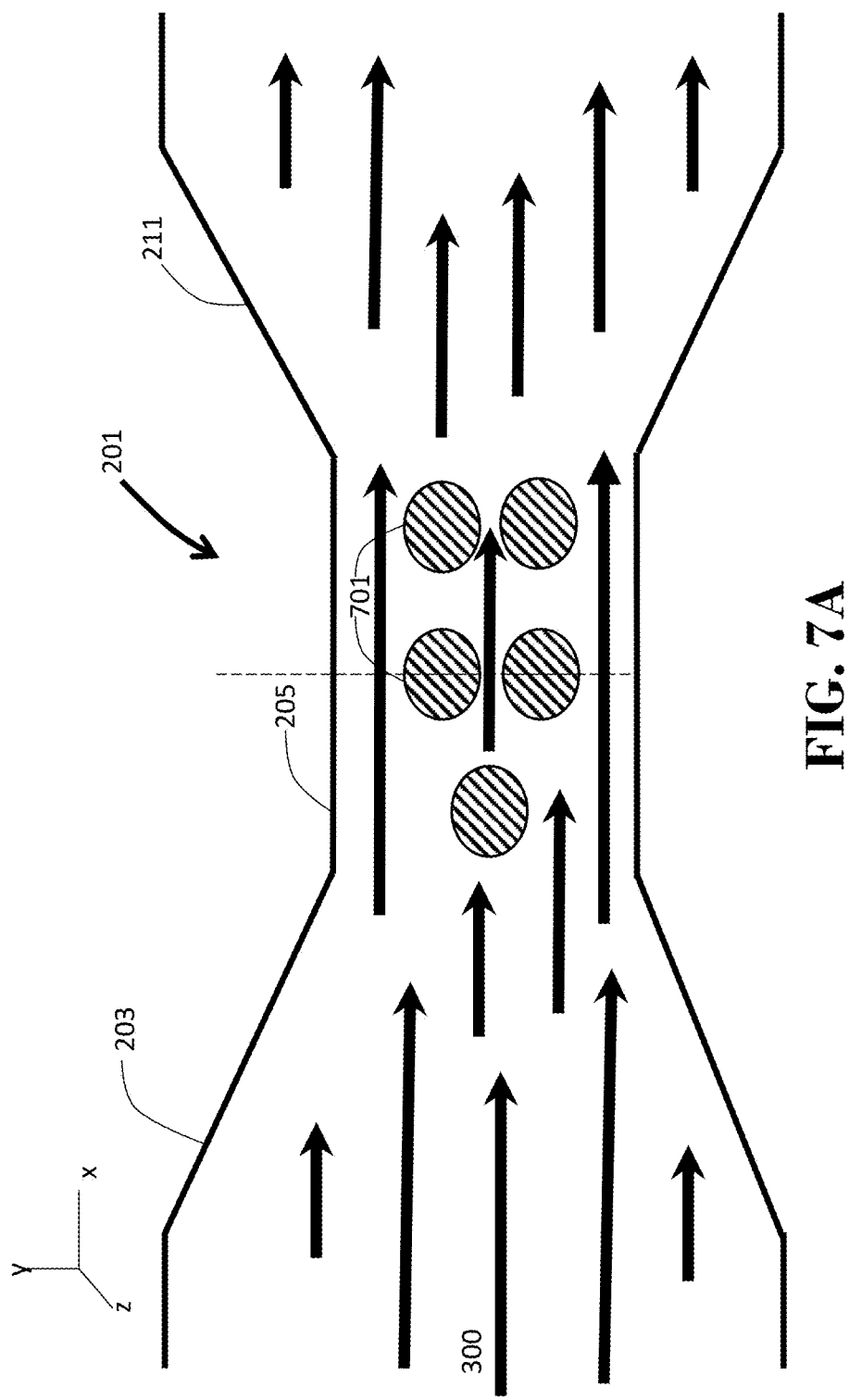
FIGS. 7A-7E are diagrams conceptually illustrating example embodiments of the present technology in accordance with an aspect of the present disclosure.
Figure 7B:
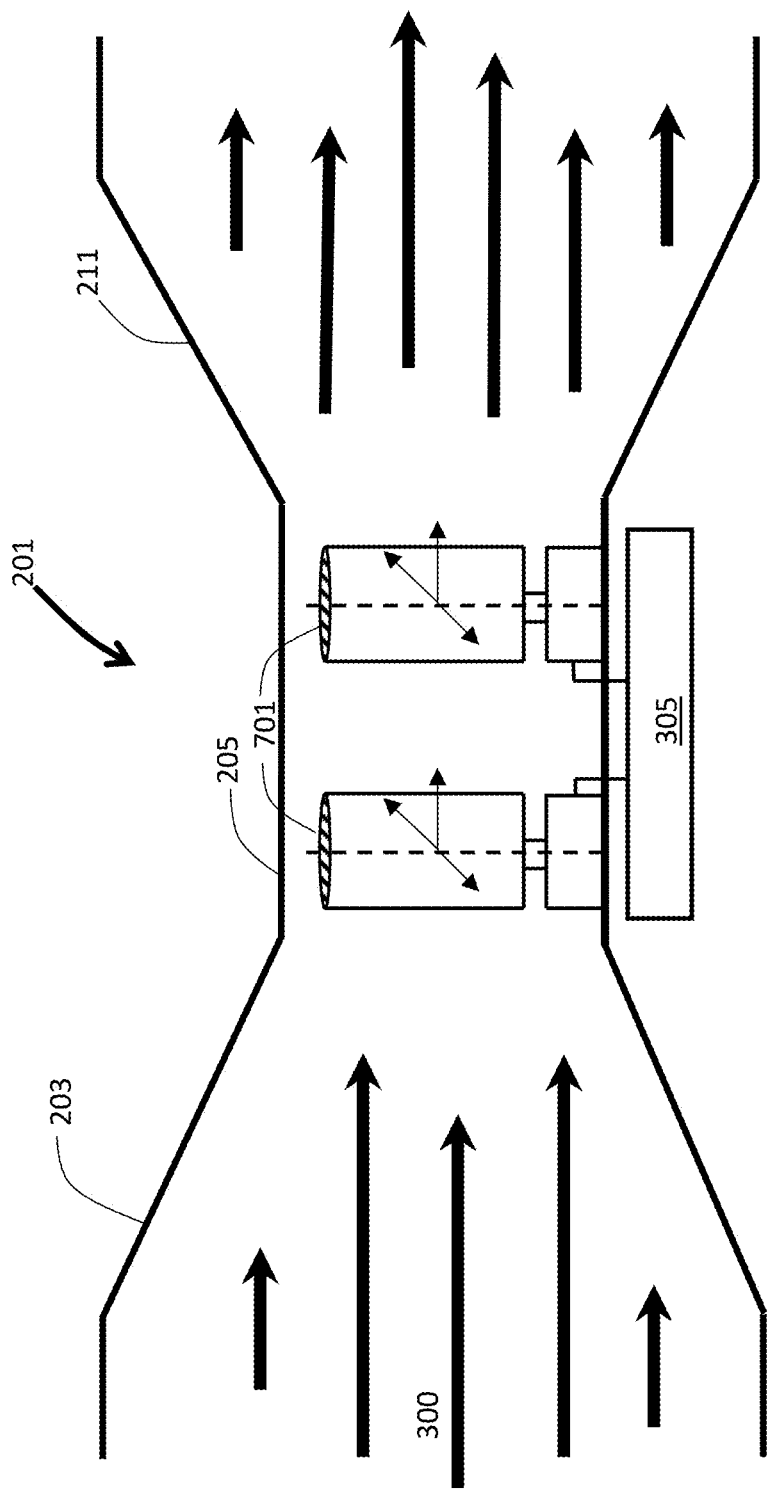

In an aspect of the present technology, the transportation vehicle 101 may include a plurality of electrical energy harvesting systems 701 disposed in the Venturi system 201 in or on the transportation vehicle 101. FIG. 7A illustrates a top view of the Venturi system 201 and the electrical energy harvesting systems 701 disposed in the constriction area 205 of the Venturi system 201. FIG. 7B illustrates a side view of the Venturi system 201 and the plurality of electrical energy harvesting systems 701 disposed in the Venturi system 201. Each of the electrical energy harvesting systems 701 may include a plurality of generating rods, each of which is configured to generate electricity based on transverse movements of the generating rod due to vortex induced vibrations. Each generating rod 701 may include an outer cylinder and an inner flexible rod for better induction of the transverse movements of the generating rod. Further, in another aspect of the present disclosure, the plurality of generating rods may be disposed in the constriction area 205 of the Venturi 201 in a predetermined arrangement such that a total amount of electrical energy harvested from the Venturi system is maximized.

Figure 7C:
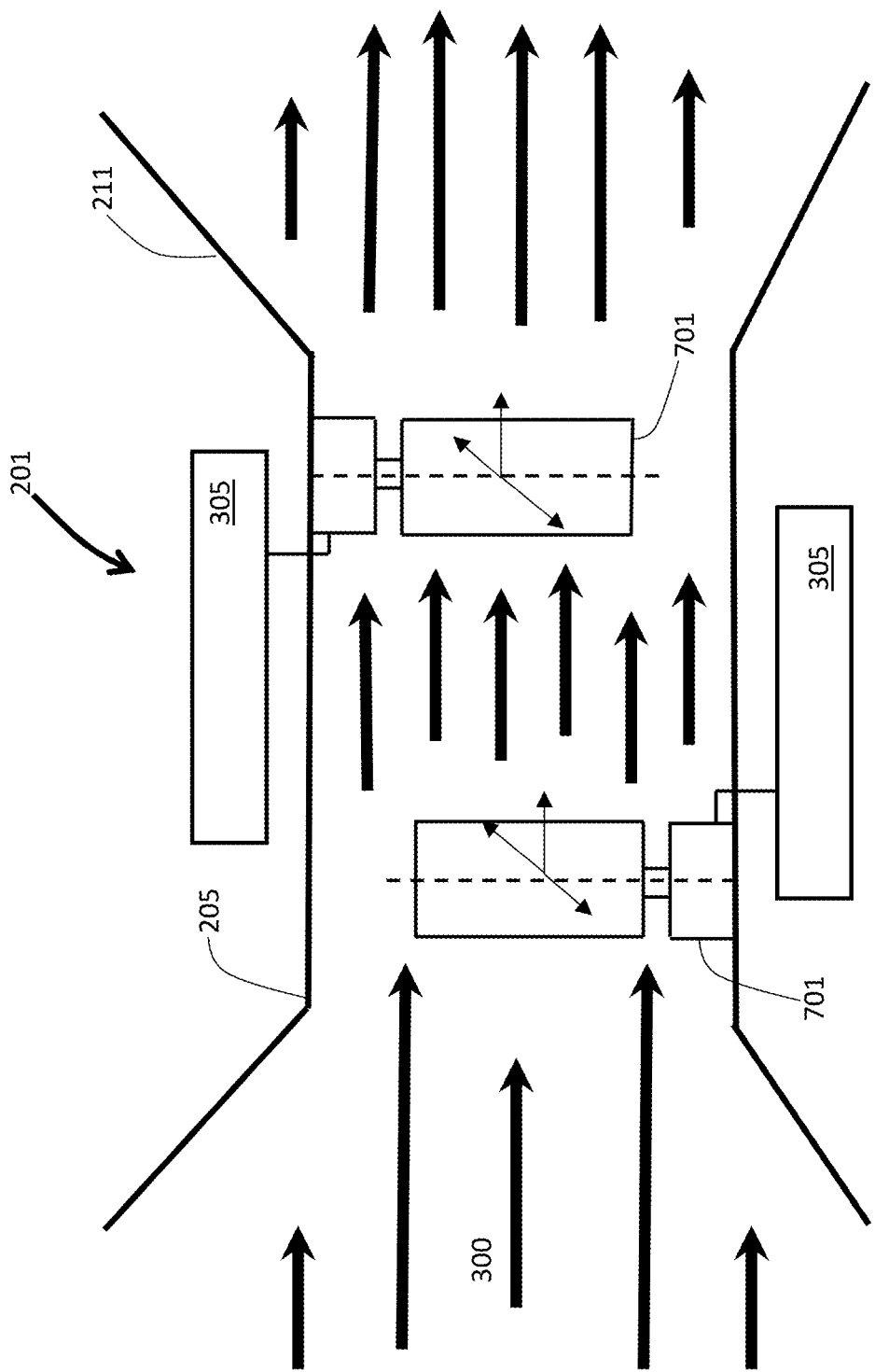

In an aspect of the present disclosure, as shown in FIG. 7C, the plurality of electrical energy harvesting systems, e.g., the generator rods 701 may be disposed in such as way that one set of generator rods may be disposed on the bottom of the constriction area 205 of the Venturi system 201 and another set of generator rods may be disposed on the ceiling of the constriction area 205 of the Venturi system 201 to maximize the electricity output harvested by the overall system. Further, the plurality of electrical energy harvesting systems 701 may be coupled to the controller 305 for control and management of the electrical energy harvested for use and storage purposes.

Figure 7E:
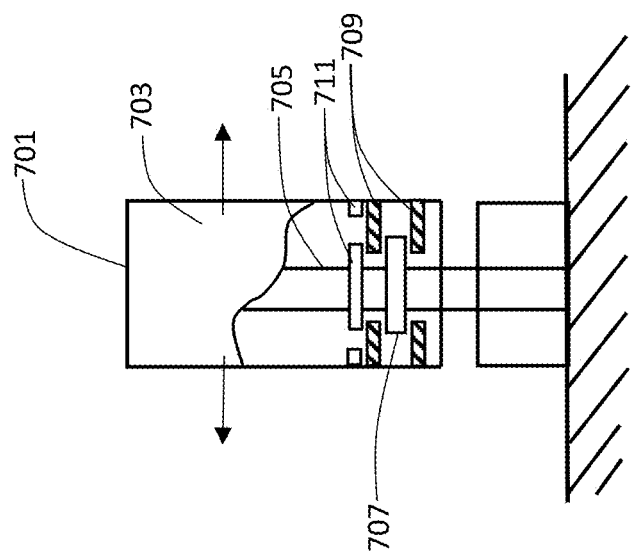
Figure 7D:
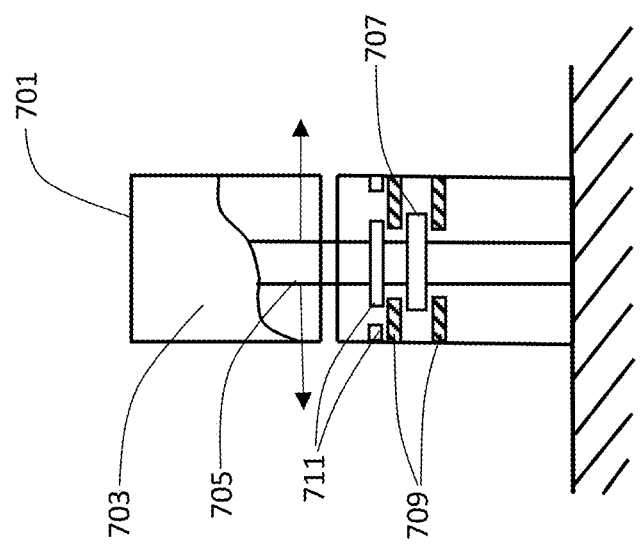

In an aspect of the present disclosure, FIG. 7D shows an example embodiment of the generating rod 701 which may include an outer cylinder 703, a flexible inner rod 705, a magnet 707 and coils 709. When the air flow 300 induces the transverse movements of the generating rod 701 due to the vortex induced vibration, the repeated movements of magnet 707 inside the coil 709 generates electricity at the coil 709, thereby converting the kinetic energy of the airflow and the transverse movement of the generator rod 701 into electrical energy for use. Further, in another aspect of the present disclosure, the coils 709 may be made of CNT wires or graphene wires instead of copper wires, thus providing further advantages in reduced weight requirements and efficiency of the generator rod 701. In another aspect of the present disclosure, the generator rod 701 may include a plurality of magnets 711 with the same magnetic polarity so that there is no contact between the outer cylinder 703 and the flexible rod 705 when the transversal movements of the generator rod 701 are made, when the vortex frequency becomes close to a natural frequency of the generator rod 701. Further, in an aspect of the present disclosure, as shown in FIG. 7E, when the generator rod 701 makes the transversal movement the outer cylinder 703 may make the transversal movements and the flexible inner rod 705 remains stationary. In such a case, the electrical energy is still generated and harvested since the magnet 707 moves inside the coils 709.

Figure 8A:
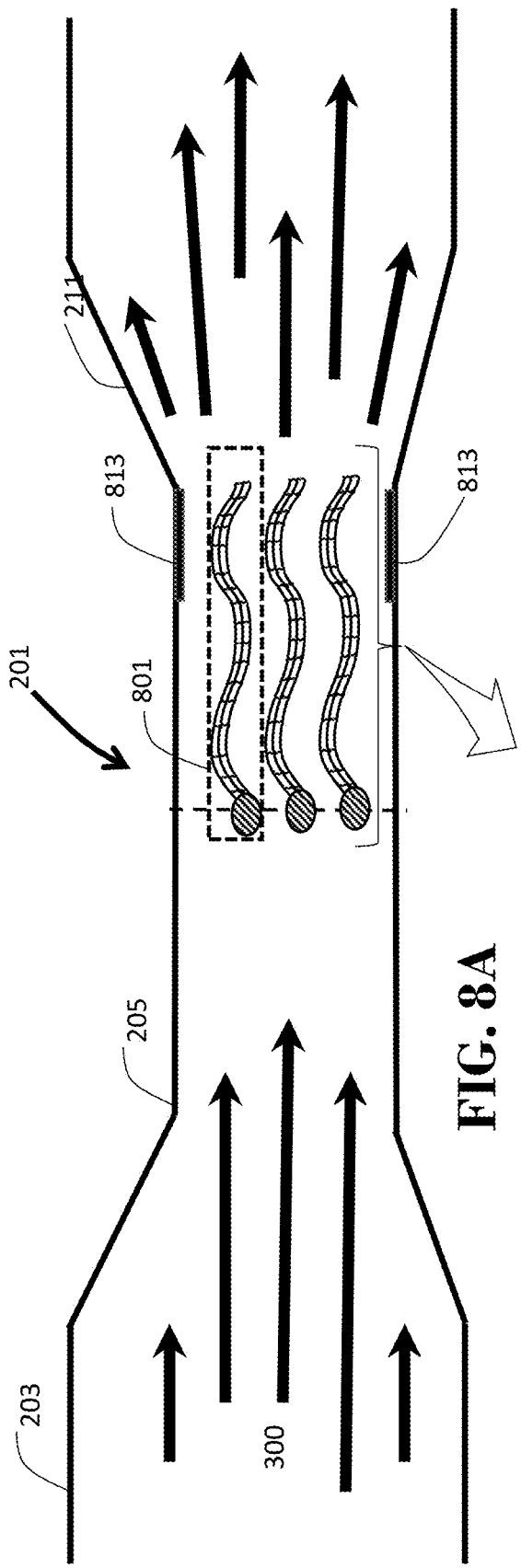
FIGS. 8A-8D are diagrams conceptually illustrating example embodiments of the present technology in accordance with an aspect of the present disclosure.
Figure 8B:
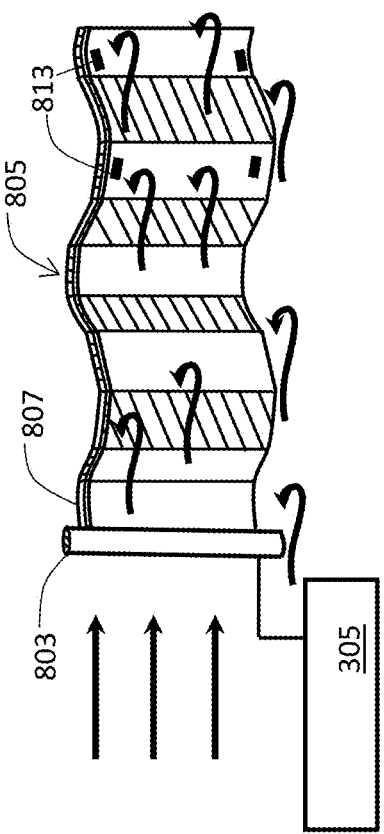

In an aspect of the present disclosure, another embodiment of the present technology is illustrated in FIGS. 8A-8D. FIG. 8A is a top view of a conceptual diagram in accordance with an aspect of the present disclosure. By way of example, a transportation vehicle or electrical vehicle 101 in accordance with an aspect of the present disclosure may include a plurality of electrical energy harvesting systems 801 disposed in the Venturi system 201 in or on the electrical vehicle 101. Each electrical energy harvesting system 801 may include a support rod 803 disposed in the constriction area 205 of the Venturi system 201, and a piezoelectric sheet 805. The piezoelectric sheet is configured to include a plurality of piezoelectric modules in the form of a flag design. Thus, when the air flow passes over the support rod 803 and because of vortex induced vibrations, it creates turbulence including vortices. The piezoelectric sheet 805 as shown in FIG. 8B is configured to capture energy stored in the turbulence and convert the kinetic energy into electrical energy for harvesting. In the example, the electricity is generated by the piezoelectric sheet 805 because of stress or force applied the piezoelectric sheet, in particular, piezoelectric modules, as part of vortex induced vibration phenomenon. An example of the piezoelectric sheet 805 may be constructed similar to a flag design using piezoelectric polymers or piezoelectric ceramics. In the example, the flag structure 805 may had a bimorph cantilever structure coupled to the support rod 803. When the electrical energy harvesting systems 801 are placed in the constriction area 205 of the Venturi system 201, the alternating forces of the air flow on two sides of the wavy, flag design piezoelectric sheet 805 creates a fluttering motion of the piezoelectric sheet 805, thereby generating electrical energy to be harvested.

Figure 8C:
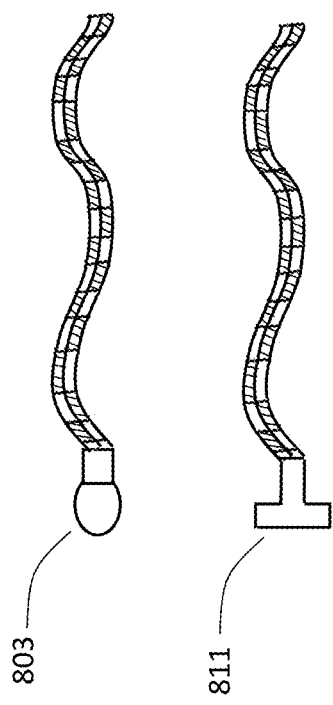
Figure 8D:
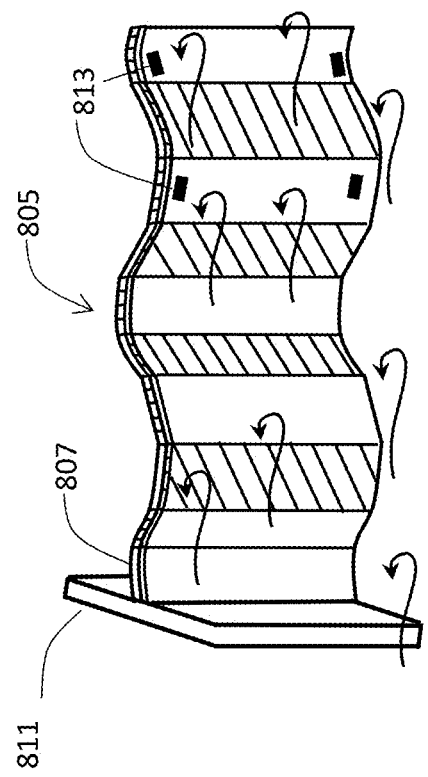

In an aspect of the present disclosure, the support rod 803 may be in the form of a cylindrical rod. Alternatively, the support rod 803 may be in the form of a T-shaped rod 811 as shown in FIGS. 8C and 8D because the T-shared rod 811 creates more turbulence behind its structure, and much to a greater extent, compared to the cylindrical rod 803. As such, the T-shaped rod 811 with the piezoelectric sheet 805 generates more electricity because of the greater stress or force imposed on the piezoelectric sheet 805, compared to the cylindrical rod 803. In another aspect of the present disclosure, in the example, the piezoelectric sheet 805 may include a plurality of piezoelectric modules for electrical energy generation.

In an aspect of the present disclosure, the electrical energy harvesting system 801 may include a stiffening part 807 between the support rod 803 and the piezoelectric sheet 805 to increase wavy motions of the piezoelectric sheet 805, thus increasing the amount of stress or force imposed on the piezoelectric sheet 805 in order to harvest more electrical energy.

Further, in an aspect of the present disclosure, the piezoelectric sheet 805 may include a plurality of magnetic strips 813 having the same magnetic polarity to prevent or minimize contact, e.g., by using magnetic repulsion between the same magnetic polarity, between adjacent piezoelectric sheets. Also, in another aspect of the present disclosure, a plurality of magnetic strips 813 may be installed on the inner wall of the Venturi system 201 in which the piezoelectric sheets 805 operate for harvesting electrical energy from the kinetic energy in the turbulence.

In another aspect of the present disclosure, the Venturi system may be designed or configured to create greater turbulence in the Venturi system for greater generation of electrical energy using piezoelectric sheets. By way of example, as shown in FIG. 9, the transportation vehicle or electric vehicle 101 may include a Venturi system 201' which includes an air inlet 203, a constriction area 205, a turbulence creation object 901 disposed in the constriction area 205, and an air outlet 215 that is configured to create more turbulence in the air outlet 215. The air outlet 215 does not include a sloped area for a diffuser area connected to the construction area 205, rather the constriction area 205 transitions to a vertically open, air outlet 215, thereby creating greater turbulence in the rectangular spaces created therein. Further, in an aspect of the present disclosure, the turbulence creation object 901 is in the form of a helix coil so that the air flow in the constriction area 205 creates a more turbulent flow with a higher speed. Leveraging the greater turbulence created in the Venturi system 201', a plurality of electrical energy harvesting systems 905 may be disposed in the outlet 215 for the purpose of maximally harvesting electrical energy from the kinetic energy stored in the turbulent air flow in the Venturi system 201. It is also noted that the turbulence creation object 901 is not limited to the helix coil, and various other structures may be used instead. Also, the air outlet 215 may be designed differently to create more turbulence in the air flow in the air outlet 215 in such a way that the electrical energy harvesting systems 905 can harvest the most electrical energy from the kinetic energy in the turbulence as possible. Further, in the example shown in FIG. 9, the electrical energy harvesting systems 905 are the electrical energy harvesting systems with the support rods in the form of cylindrical rod, but it is not to be limited thereto, and other forms of the electrical energy harvesting systems that uses the turbulence in the air flow may be used, including example embodiments disclosed herein in the present disclosure, such as cylindrical generating rods, T-shaped rods with piezoelectric sheets, etc.

Further, in another aspect of the present disclosure, when the Venturi system that is used in or on the transportation vehicle or the electric vehicle 101 has a height restriction because of its position in the electric vehicle (e.g., a bottom of the vehicle or on the under body, or a top of the vehicle above), the electrical energy harvesting systems may be disposed or positioned so that the height restriction requirement is met. In such a case, for example, as shown in FIGS. 10A and 10B, when the piezoelectric sheets are used for harvesting electrical energy in the Venturi system 201, a long support rod 1011 may be used across the air passage in the constriction area 205 and a plurality of piezoelectric sheets 1013 similar to those 805 shown in FIGS. 8A-8D may be coupled to the long support rod 1011.

In an aspect of the present disclosure, various embodiments of the present technology may be installed or mounted in different forms on or in a transportation vehicle including the electric vehicle 101. By way of example, the example embodiments of the present technology may be installed or designed into sides of the electrical vehicle 101 as shown in FIG. 11A. In an aspect of the present disclosure, a Venturi system 201 may be integrated into the sides of the electric vehicle 101 with the constriction area installed in a front door of the electric vehicle. Further, a plurality of electrical energy harvesting systems 1107 may be installed in the constriction area of the Venturi system 201. Also, in another aspect of the present disclosure, one or more filters 1103, 1105 may be installed in the Venturi system 201 to present entry of debris or the like from outside. Furthermore, in an aspect of the present disclosure, in case of debris build-ups in front of the one or more filters 1103, 1105, one or more openings with door panels (not shown) may be constructed in the Venturi system 201 for easy removal and cleaning of the built-up debris in the Venturi system 201.

In another aspect of the present technology, the Venturi system 201 with electrical energy harvesting systems 1107 disposed in the constriction area of the Venturi system 201 may be installed or disposed on the top of the electric vehicle 101, as shown in FIG. 11B. Alternatively, the Venturi system 201 with the electrical energy harvesting systems 1107 disposed in the construction area of the Venturi system 201 may be installed or integrated with an underbody frame (not shown) of the electrical vehicle 101. Many different configurations of the Venturi system 201 with the electrical energy harvesting systems are possible and may be placed within or on the electric vehicle 101 for increased efficiency of the electric vehicle 101.

For at least foregoing, by incorporating one or more embodiment or its variants of the present technology in the electric vehicle 101, it would be possible to additionally extend the driving distance of the electric vehicle 101, by harvesting electrical energy based in part on the kinetic energy stored in the wind or air flow created, as the electric vehicle 101 is driven with a speed on both highways and regular roads.

In another aspect of the present disclosure, the Venturi system 201 may be automatically reconfigured by means of a control device or any other external device (not shown) in the electric vehicle 101. By way of example, the Venturi system may be automatically configured in such a way that the diameters D1, D2, and D3 of the Venturi system may be automatically adjusted or changed while the electricity is being generated by electrical energy harvesting systems to control and manage the electricity generation and harvesting at different speeds of the electric vehicle 101. As such, the Venturi system 201 may include flexible designs using flexible materials for such re-configurations on the fly.

In an aspect of the present disclosure, the Venturi system 201 with the electrical energy harvesting systems may be installed or designed into any type of a transportation vehicle or a transportation system, including but not limited thereto, an automobile, an aircraft, a drone, a boat, an underwater vehicle, etc., or the like.

As mentioned earlier, the generated electricity may be used to recharge a main battery or a subsidiary battery of the electric vehicle for reaching a longer range for travel or powering electronics on-board the electric vehicle. In an aspect of the present disclosure, a manual or automatic turn-on or turn-off feature may be included as part of the electrical energy harvesting system in the electric vehicle. That is, an operator of the electric vehicle may be able to turn-on or turn-off the use of the Venturi system with the electrical energy harvesting systems by a user command or control on the driver console or electronic display in the electric vehicle.

As a result, the present technology may improve the efficiency of the electric vehicle, thereby enabling driving of the electric vehicle for a longer distance traveled without making frequent stops at public or private charging stations on the road. When the electric vehicle is in motion, additional electricity may be harvested and stored in storage units or power on-board electronics, thereby conserving the use of the main battery of the electric vehicle.

Figure 12:
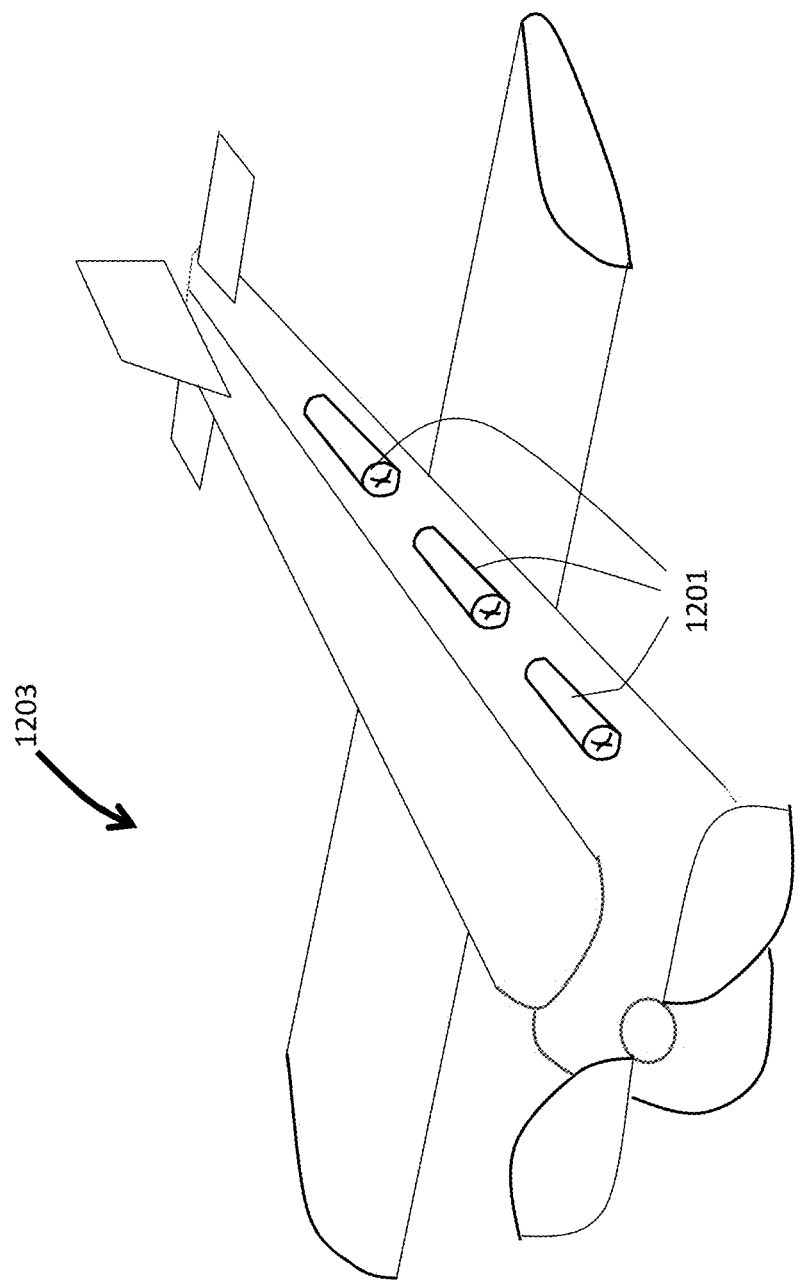
FIG. 12 is a diagram conceptually illustrating an example embodiment of the present technology in accordance with an aspect of the present disclosure.

Further, in an aspect of the present disclosure, the present technology including the Venturi system with electric energy harvesting systems 1201 may be installed or integrated in other transportation vehicles 1203 such as an aircraft or a drone, as shown in FIG. 12, to generate and harvest electrical energy for recharging one or more on-board batteries as well as powering on-board electronic systems during its flight, thereby significantly improving fuel efficiency or a flight time of the aircraft Further, it is noted that for a drone application, generated electricity during its flight may dramatically increase its flight time as well as enhance other operational aspects during the flight.

Further, in another aspect of the disclosure, the present technology may be installed or integrated in a vehicle such as a boat or a submarine or an underwater vehicle in order to generate and harvest electricity while the vehicle is in motion through utilizing the Venturi system 201 being able to generate and harvest electricity as the advantage of an accelerated fluid flow in a Venturi system 201 is not limited to air flow.

As mentioned earlier, the present technology may supplement the main power source such as the main battery for the transportation system such as a transportation system by converting kinetic energy of the transportation system into electric energy for use, thereby increasing the efficiency of the transportation system. The present technology may be installed or designed in as part of any transportation system that "moves" with a speed for any purpose. By using one or more embodiments of the present technology, alone or in combination with others, the present technology will increase the efficiency of the transportation system by increasing a total travel distance of the transportation system. Also, as noted above, the present technology may be combined with other existing and/or future technology to generate and harvest electricity from various kinetic energy including wind or air flow energy. Further, by incorporating one or more aspects of the present technology it may help a wider adoption of an electric vehicle or a transportation system because of the increased efficiency of the electric vehicle or the transportation system (e.g., a longer driving distance or a longer travel range results in less reliance on development of additional infrastructure).

For at least the foregoing, the present technology provides numerous benefits and improvements including a longer range of a transportation system by generating and harvesting additional electricity for immediate use and storage into one or more batteries while the transportation system is in motion.

Figure 13:
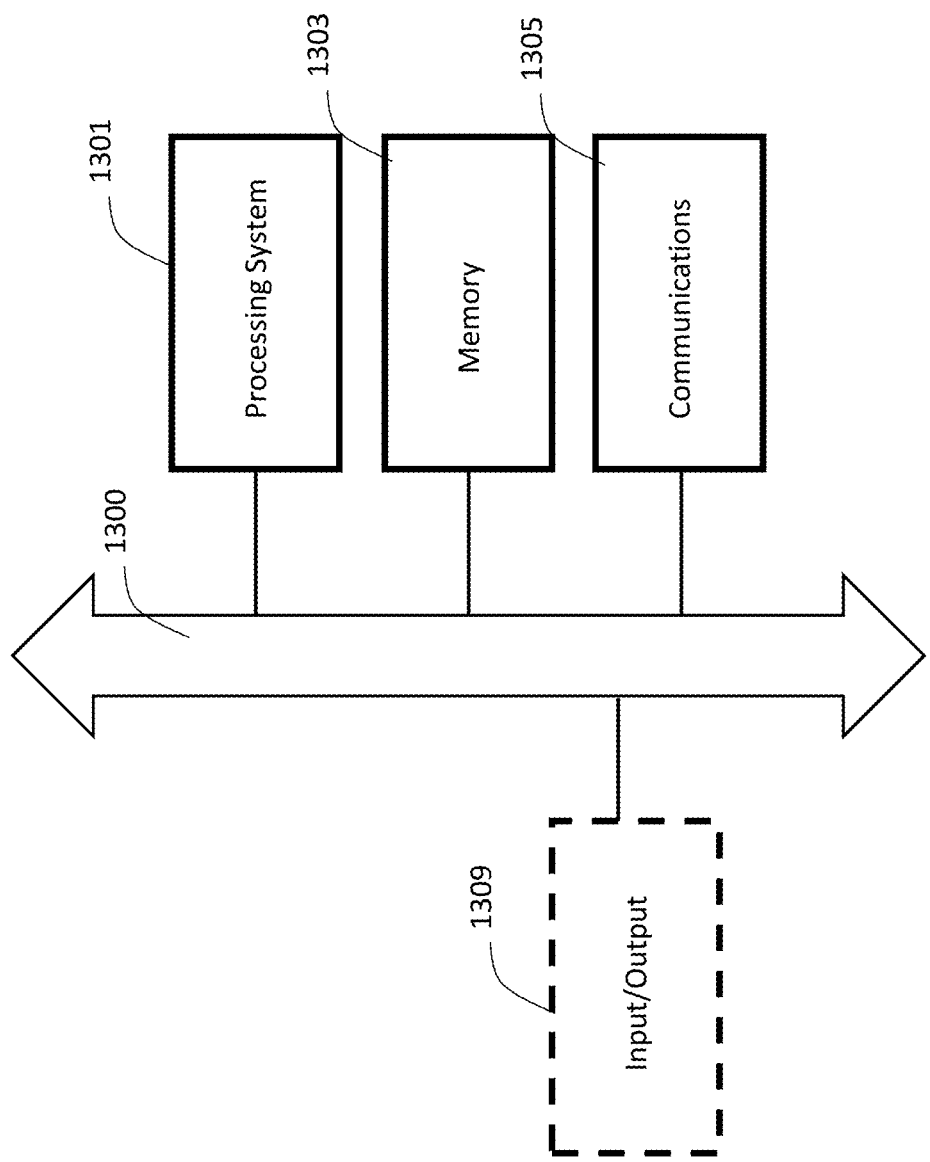
FIG. 13 illustrates an example embodiment of the present technology in accordance with an aspect of the present disclosure.

In an aspect of the present technology, the controller 305 or other electronics that are interacting with the present technology may be implemented by one or more processing system(s). FIG. 13 shows a diagram illustrating an example of a processing system in accordance with an aspect of the present disclosure. An apparatus shown in FIG. 13 may be configured to control and/or monitor the controller 305, Venturi system 201, and/or electrical energy harvesting systems 301, 471, 701, 801, 905, 1013, 1107, as shown in various figures. By way of example, the controller 305 may be implemented by a system shown in FIG. 13. As shown in FIG. 13, a bus 1300 may link together various circuits, including one or more processing systems (or processors) 1301, one or more memories 1303, one or more communication interfaces 1305, and/or one or more input/output devices 1309. The one or more processing systems may be responsible for managing the bus and general processing, including the execution of software stored on a non-transitory computer-readable medium. Further, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems. The one or more input/output devices may include devices that permit inputting information and/or outputting information to an operator.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), field programmable gate arrays (FPGAs), and other suitable hardware configured to perform various functions described herein. The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

Also, the term "software" as used herein includes various types of machine instructions including instructions, code, programs, subprograms, software modules, applications, software packages, routines, subroutines, executables, procedures, functions, etc. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a particular application within design constraints.

The term "unit," "device" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combinations thereof. The unit thus may include software components, task components, processes, procedures, functions, program code, firmware, micro-codes, circuits, data structures, tables, arrays, and variables.

The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure.

As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure.

Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. Also, the term "in" includes "in" and "on".

In the present disclosure, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A transportation vehicle with energy harvesting systems, the transportation vehicle comprising:
   a Venturi system configured to receive an incoming air flow, the Venturi system comprising a constricted area in which a speed of the incoming air flow is increased due to a Venturi effect; and
   the energy harvesting systems comprising a plurality of electrical energy harvesting systems being disposed in the Venturi system of the transportation vehicle,
   wherein each of the electrical energy harvesting systems is configured to generate electricity from the incoming air flow in the Venturi system as the transportation vehicle moves forward in motion;
   wherein each of the electrical energy harvesting systems comprises:
      a Darrieus-type wind turbine, the wind turbine having a longitudinal rotation axis perpendicular to a direction of the incoming air flow, the turbine comprising a pair of blades, the blades being connected to each other at two opposite ends of the rotation axis,
      a triboelectric sheet comprising a plurality of triboelectric modules, each triboelectric module comprising at least two layers, and
      a displacer coupled to the pair of blades and to the triboelectric sheet via a shaft, wherein the displacer comprises:
         a rotatable body coupled to the shaft; and
         a protrusion disposed on the rotatable body, the protrusion facing the triboelectric sheet,
   wherein rotary movement of the pair of blades about the rotation axis due to the air flow in the Venturi system results in rotary movement of the displacer, and
   wherein as the displacer rotates around the shaft, the displacer passes over the triboelectric modules to cause contact of the at least two layers of each triboelectric module to thereby cause each triboelectric module to generate electricity.

2. The transportation vehicle of claim 1, wherein each of the electrical energy harvesting systems further comprises an alternator including a magnet and coils, the alternator connected to one end of the pair of blades.

3. The transportation vehicle of claim 2, wherein the coils of the alternator comprise carbon nanotube-based wires or graphene-based wires.

* * * * *